(12) United States Patent
He et al.

(10) Patent No.: US 12,279,312 B2
(45) Date of Patent: Apr. 15, 2025

(54) DL CONTROL RESOURCES SETS AND RACH PROCEDURE DURING INITIAL ACCESS

(71) Applicant: Apple Inc., Cupertino, CA (US)

(72) Inventors: Hong He, Cupertino, CA (US); Dawei Zhang, Saratoga, CA (US); Haitong Sun, Irvine, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 444 days.

(21) Appl. No.: 17/439,349

(22) PCT Filed: Aug. 6, 2021

(86) PCT No.: PCT/CN2021/111175
§ 371 (c)(1),
(2) Date: Sep. 14, 2021

(87) PCT Pub. No.: WO2023/010525
PCT Pub. Date: Feb. 9, 2023

(65) Prior Publication Data
US 2023/0276499 A1   Aug. 31, 2023

(51) Int. Cl.
*H04W 74/08* (2024.01)
*H04L 5/00* (2006.01)
(Continued)

(52) U.S. Cl.
CPC ....... *H04W 74/0833* (2013.01); *H04L 5/0053* (2013.01); *H04W 74/006* (2013.01)

(58) Field of Classification Search
CPC ............ H04W 74/0833; H04W 74/006; H04L 5/0053
(Continued)

(56) References Cited

U.S. PATENT DOCUMENTS

2018/0324678 A1  11/2018  Chen et al.
2021/0235419 A1*  7/2021  Si .......................... H04W 16/14
(Continued)

FOREIGN PATENT DOCUMENTS

CN   109716843 A   5/2019
CN   111435904 A   7/2020

OTHER PUBLICATIONS

International Search Report and Written Opinion for PCT/CN2021/111175; 12 pages; May 9, 2022.
(Continued)

*Primary Examiner* — Faisal Choudhury
(74) *Attorney, Agent, or Firm* — Kowert, Hood, Munyon, Rankin & Goetzel, P.C.

(57) ABSTRACT

Apparatuses, systems, and methods for downlink control resources sets and RACH procedures during initial access in wireless communication, e.g., in 5G NR systems and beyond, including methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs.

20 Claims, 19 Drawing Sheets

(51) Int. Cl.
*H04W 74/00* (2009.01)
*H04W 74/0833* (2024.01)

(58) Field of Classification Search
USPC .......................................... 370/329
See application file for complete search history.

(56) References Cited

U.S. PATENT DOCUMENTS

| | | | |
|---|---|---|---|
| 2022/0191840 A1* | 6/2022 | Si | H04L 5/0007 |
| 2022/0361158 A1* | 11/2022 | Sakhnini | H04L 5/0044 |
| 2023/0037998 A1* | 2/2023 | Lin | H04W 74/006 |
| 2023/0062505 A1* | 3/2023 | Khoshnevisan | H04W 16/28 |
| 2023/0189234 A1* | 6/2023 | Hou | H04W 72/0453 |
| | | | 370/329 |
| 2023/0217503 A1* | 7/2023 | Xu | H04B 1/713 |
| | | | 370/329 |
| 2023/0247676 A1* | 8/2023 | Shin | H04W 52/0216 |

OTHER PUBLICATIONS

Huawei et al. "Initial access signals and channels for 52-71GHz spectrum"; 3GPP TSG RAN WG1 #105-e R1-2104273; 16 pages; May 10-27, 2021.
SAMSUNG "Initial access aspects for NR from 52.6 GHz to 71 GHz"; 3GPP TSG RAN WG1 #105-e R1-2105297; 10 pages; May 10-27, 2021.

\* cited by examiner

| Index | SSB and CORESET Multiplexing Pattern | Number of PRBs | Number of Symbols | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | -20 or -21 |
| 5 | 3 | 24 | 2 | 24 |
| 6 | 3 | 48 | 2 | -20 or -21 |
| 7 | 3 | 48 | 2 | 48 |
| 8 | 1 | 96 | 1 | 38 |
| 9 | 1 | 96 | 2 | 38 |
| 10 | Reserved | | | |
| 11 | Reserved | | | |
| 12 | Reserved | | | |
| 13 | Reserved | | | |
| 14 | Reserved | | | |
| 15 | Reserved | | | |

| Index | SSB and CORESET Multiplexing Pattern | Number of PRBs | Number of Symbols | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 4 |
| 4 | 1 | 48 | 2 | 0 |
| 5 | 1 | 48 | 2 | 1 |
| 6 | 1 | 48 | 2 | 2 |
| 7 | 1 | 48 | 2 | 4 |
| 8 | 1 | 96 | 1 | 0 |
| 9 | 1 | 96 | 1 | 1 |
| 10 | 1 | 96 | 1 | 2 |
| 11 | 1 | 96 | 1 | 4 |
| 12 | 1 | 96 | 2 | 0 |
| 13 | 1 | 96 | 2 | 1 |
| 14 | 1 | 96 | 2 | 2 |
| 15 | 1 | 96 | 2 | 4 |

| Segment Index Field Value | $[w_0, w_1, w_2, \ldots, w_{23}]$ |
|---|---|
| 00 | $[0, 0, 0, \ldots, 0]$ |
| 01 | $[1, 1, 1, \ldots, 1]$ |
| 10 | $[1, 0, 1, 0, \ldots, 1, 0]$ |
| 11 | $[0, 1, 0, 1, \ldots, 0, 1]$ |

*FIG. 14B*

DL CONTROL RESOURCES SETS AND RACH PROCEDURE DURING INITIAL ACCESS

PRIORITY CLAIM INFORMATION

This application is a national stage application of International Application No. PCT/CN2021/111175, filed on Aug. 6, 2021, titled "DL Control Resources Sets and RACH Procedure during Initial Access", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for downlink control resources sets and random access channel (RACH) procedures during initial access in wireless communication, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS) and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for downlink control resources sets and RACH procedures during initial access in wireless communication, e.g., in 5G NR systems and beyond.

For example, embodiments include methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs. Thus, a UE may configure and/or receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS) and a resource block offset based one or more of a synchronization raster and a component carrier raster. The configuration for a CORESET by a data structure that includes one or more indexes.

As another example, a UE may receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW, e.g., based on the configuration and resource block offset. Further, the UE may monitor a Type0 physical downlink control channel (PDCCH) search space set in at least one of the CORESET #0 or RMSI slot that is paired with an SSB index of the one or more SSB transmissions within the SSBBW.

As a further example, a UE may determine positions of random access channel (RACH) occasion (RO) slots with a third SCS within a physical RACH (PRACH) slot of a reference sub-carrier spacing (SCS) based on a configuration index included in a higher layer parameter. Additionally, the UE may determine a distribution of ROs with the third SCS based on a total number of time domain ROs in the PRACH slot of the reference SCS. The third SCS may be one of a 480 kHz SCS or a 960 kHz SCS, which may be larger than the reference SCS of the PRACH slot.

As yet another example, a UE may receive, via a downlink control indicator (DCI) format 1_0 that schedules random access channel (RACH) response (RAR) transmissions, a segment index of a corresponding RACH occasion (RO). The segment index may be based, at least in part, on a sub-carrier spacing (SCS). Additionally, the UE may determine a random access (RA) radio network temporary identifier (RNTI) based on a physical random access channel (PRACH) transmission window being divided into a number of slot sub-groups. Note that the number of slot sub-groups may be based on the SCS of the RO and may determine the segment index.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 illustrates an example of a table defining a set of RBs and slot symbols of CORESET for Type0-PDCCH search space set, according to some embodiments.

FIG. 10 illustrates another example of a table defining a set of RBs and slot symbols for Type0-PDCCH search space set, according to some embodiments.

FIG. 14B illustrates an example of a table of scrambling sequences for time-domain ROs determination, according to some embodiments.

Figure 1A:
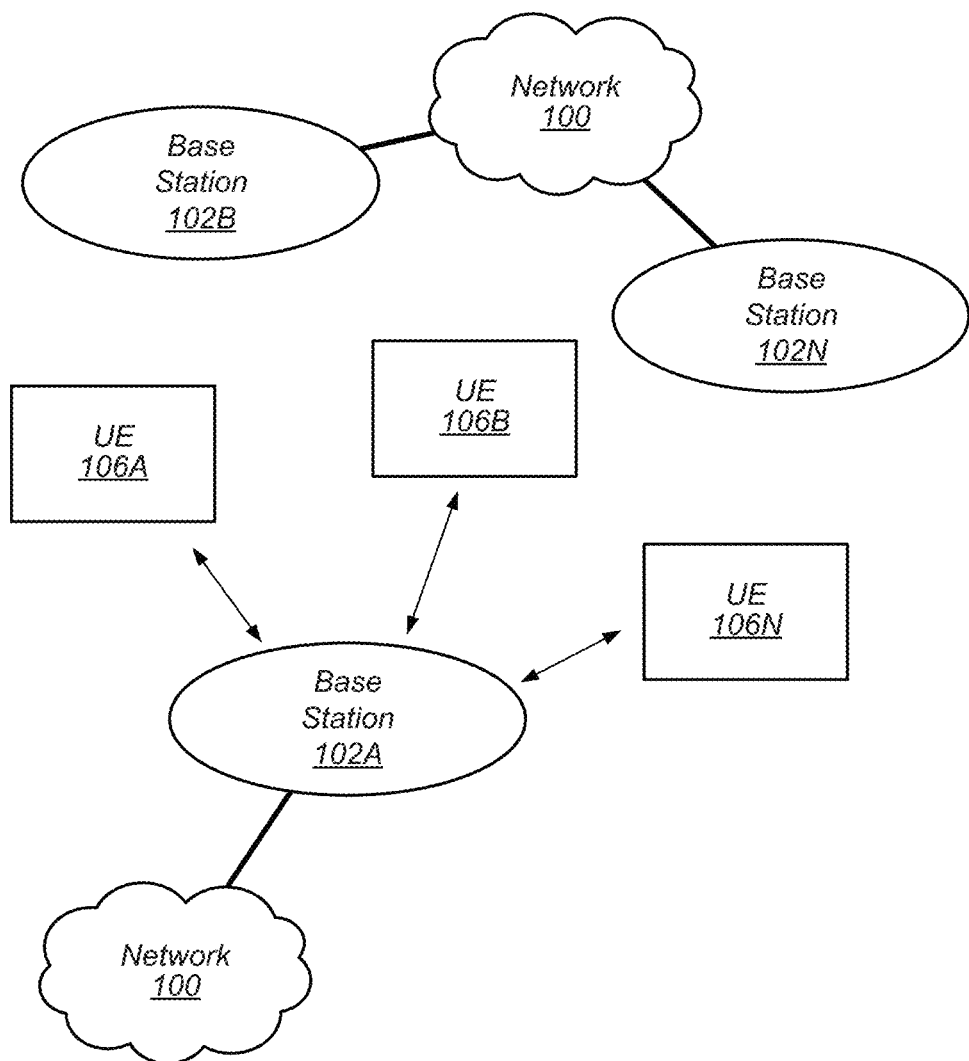
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
CBRS: Citizens Broadband Radio Service
DAS: Distributed Antenna System
5GS: 5G System
5GMM: 5GS Mobility Management
5GC/5GCN: 5G Core Network
SIM: Subscriber Identity Module
eSIM: Embedded Subscriber Identity Module
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
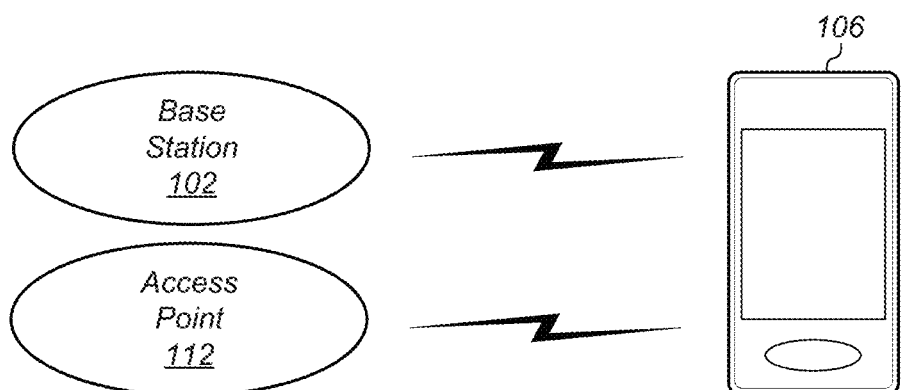
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 2:
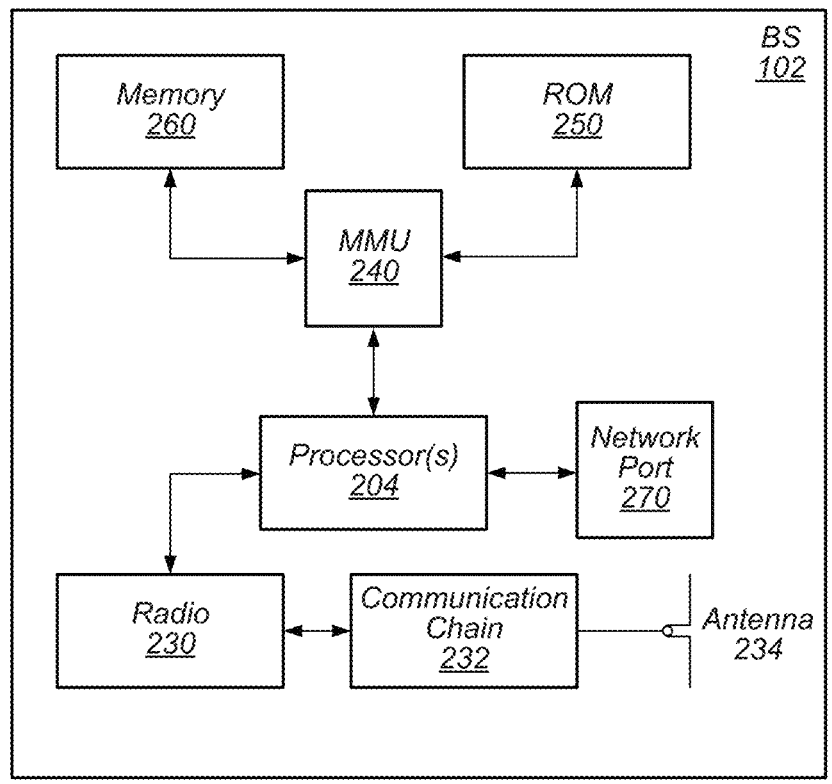
FIG. 2 illustrates an example block diagram of a base station, according to some embodiments.

FIG. 2: Block Diagram of a Base Station

Figure 3:
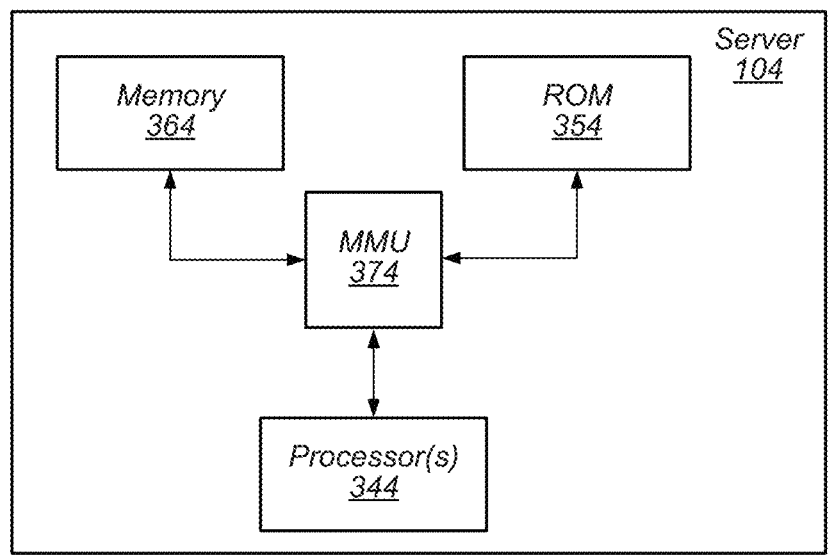
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
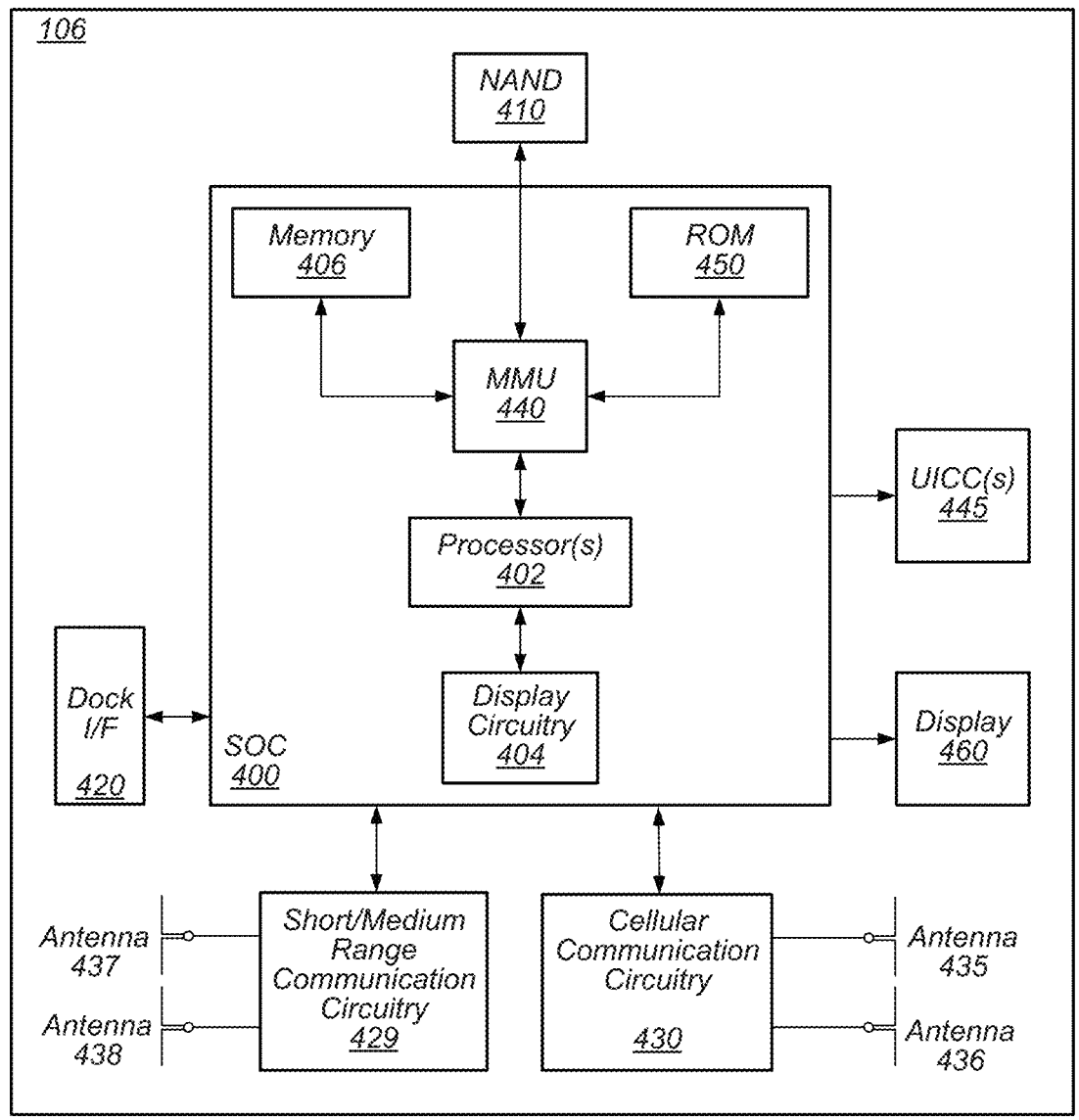
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in 5G NR systems and beyond, as further described herein. For example, the communication device 106 may be configured to perform methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
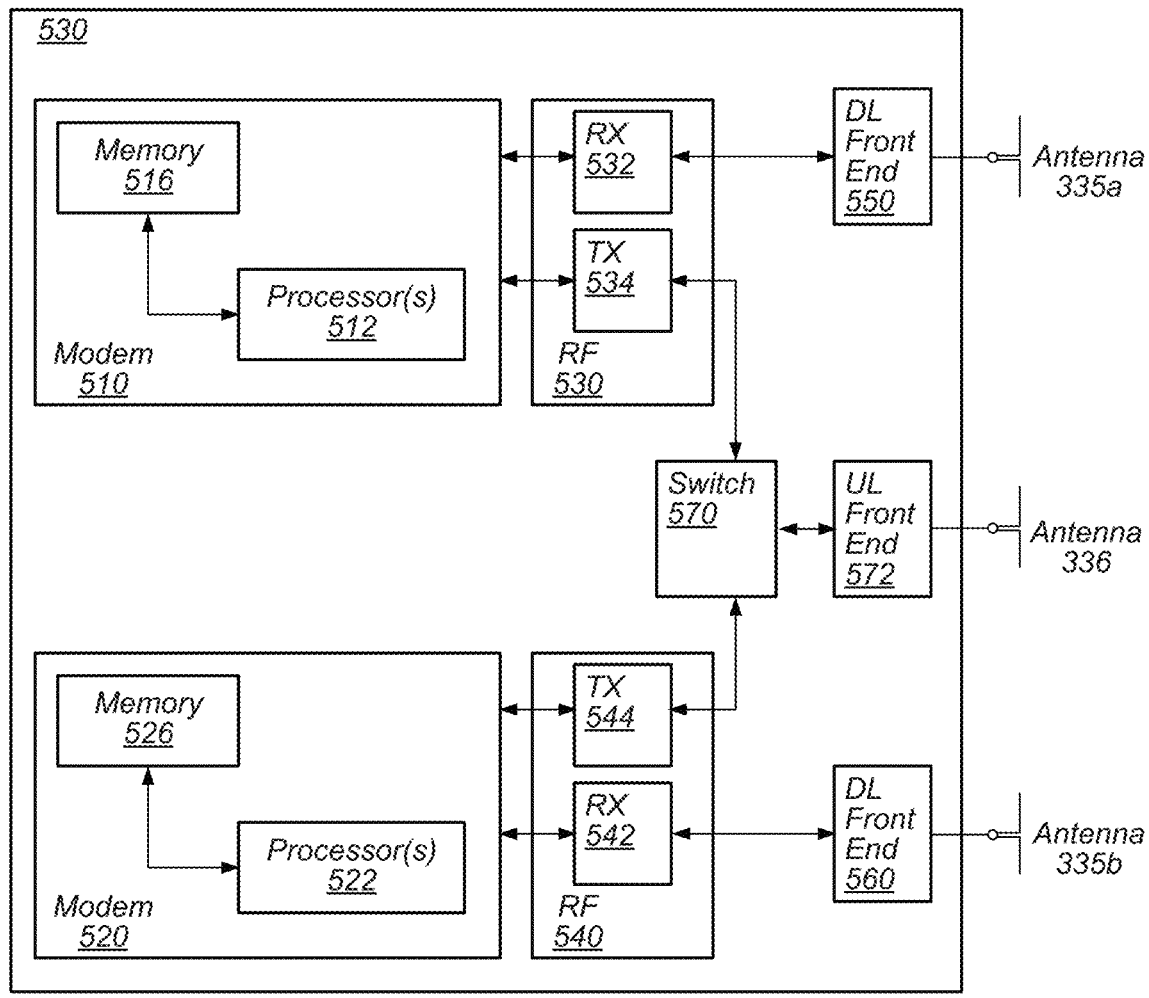
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435a-b and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for downlink control resources sets and RACH procedures during initial access in wireless communication, e.g., in 5G NR systems and beyond, as further described herein. For example, the cellular communication circuitry 530 may be configured to perform methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
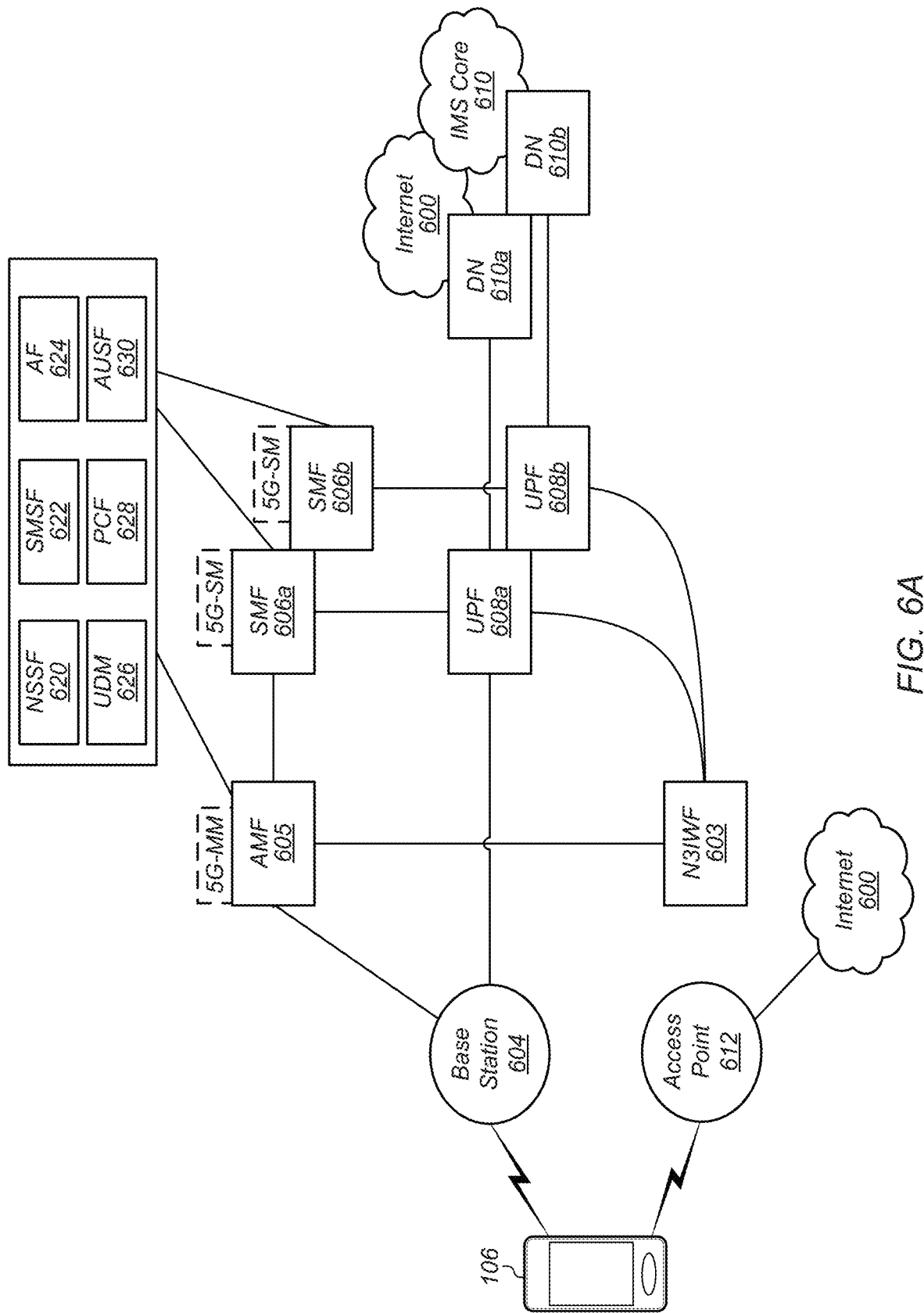
FIG. 6A illustrates an example of a 5G network architecture that incorporates both 3GPP (e.g., cellular) and non-3GPP (e.g., non-cellular) access to the 5G CN, according to some embodiments.
Figure 6B:
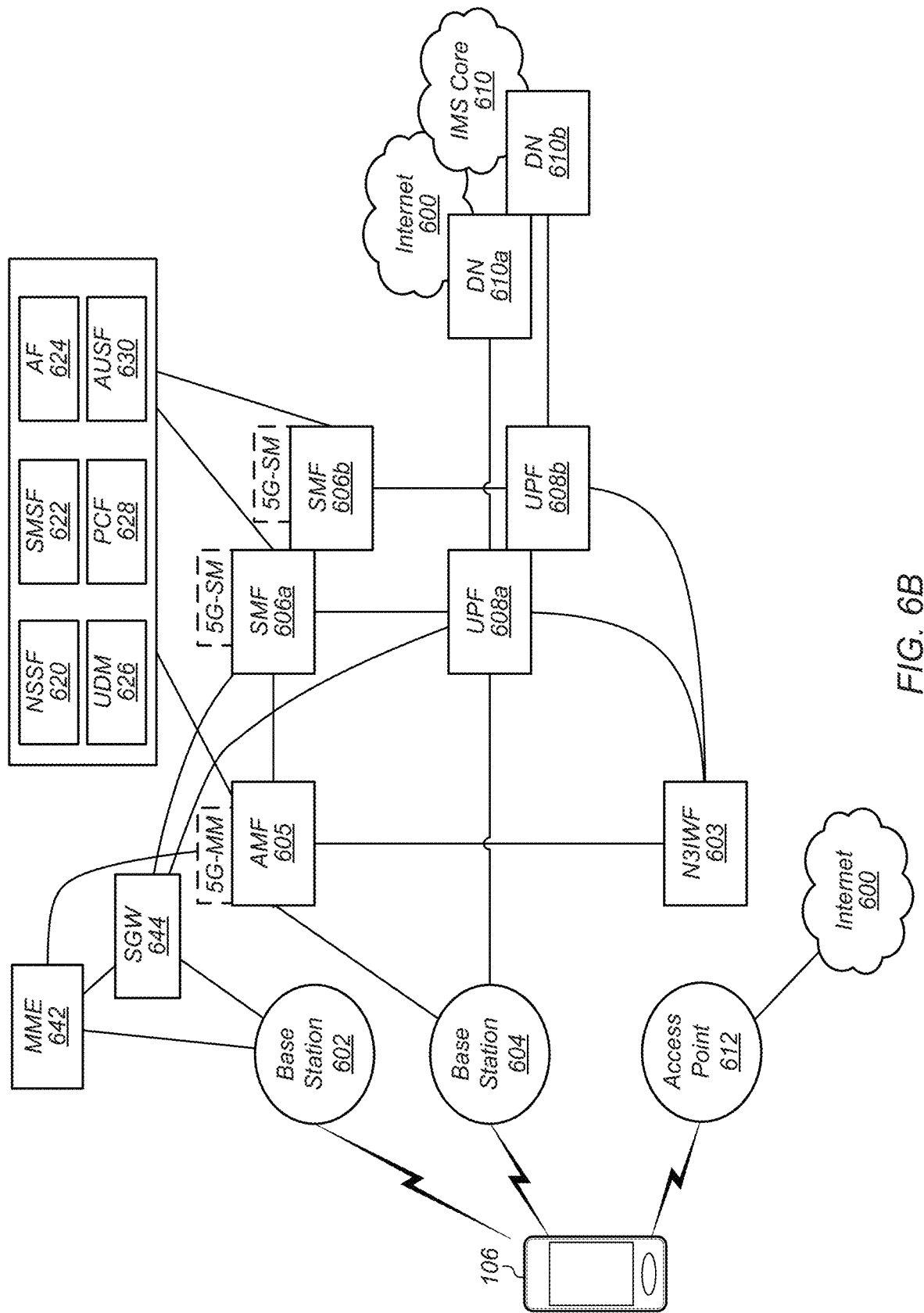
FIG. 6B illustrates an example of a 5G network architecture that incorporates both dual 3GPP (e.g., LTE and 5G NR) access and non-3GPP access to the 5G CN, according to some embodiments.
Figure 7:
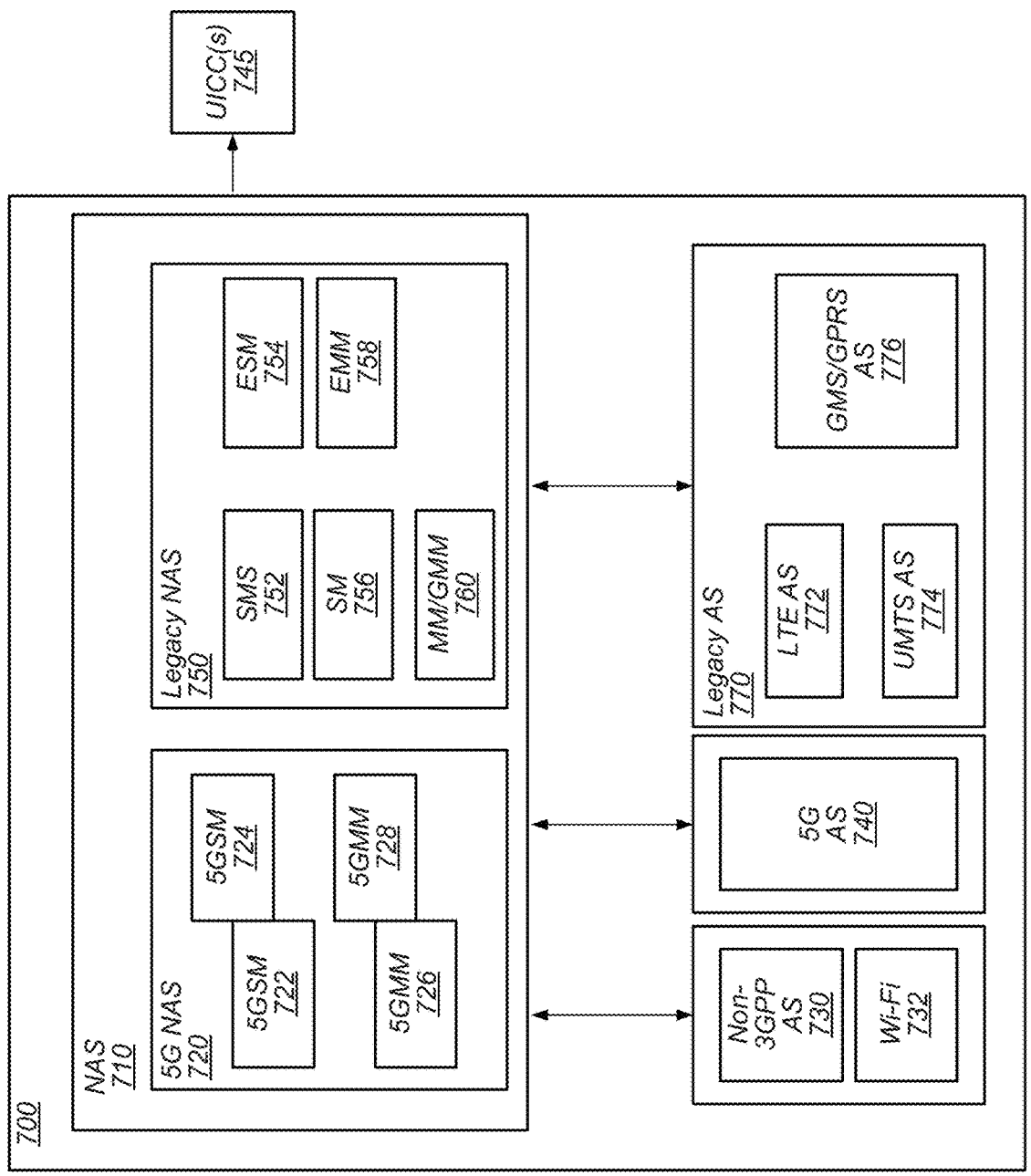
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods to improve security checks in a 5G NR network, including mechanisms for downlink control resources sets and RACH procedures during initial access in wireless communication, e.g., in 5G NR systems and beyond, e.g., as further described herein. For example, the one or more of the above-described network entities may be configured to perform methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for downlink control resources sets and RACH procedures during initial access in wireless communication, e.g., in 5G NR systems and beyond, e.g., as further described herein. For example, the one or more of the above-described functional entities may be configured to perform methods for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs.

Downlink Control Resources Sets and RACH Procedures During Initial Access

In current implementations, cellular systems, e.g., such as 5G NR systems, may be configured to operate on higher frequency bands, such as on frequencies up to 71 gigahertz (GHz) considering both licensed and unlicensed operation. Additionally, initial access channels (e.g., synchronization signal block (SSB)) support up to 64 SSB beams for licensed and unlicensed operation as well as 120 kilohertz (kHz) sub-carrier spacing (SCS) for initial access related signals/channels in an initial bandwidth part (BWP). Further, with regards to physical random access channel (PRACH) configuration and to accommodate operations in the higher frequencies, SCS of 480 kHz and 960 kHz have been specified as well as a minimum PRACH configuration period of 10 milliseconds (ms).

However, remaining issues for operation in higher frequencies and for supporting the new SCS options include how to determine a bandwidth of a CORESET #0, especially when considering the associated coverage performance for system information block (SIB) 1 PDCCH and PDSCH transmission. Another issue is how to support mixed numerologies between SSB, e.g., between 120 kHz SCS and 480 kHz SCS Type0-PDCCH/SIB1 transmission or multiplexing pattern 1 as preferred for some operators e.g., (SSB, Type-1 PDCCH)=(120 kHz, 480 kHz/960 kHz SCS) with multiplexing pattern 1. A further issue is how to determine RACH occasions (ROs) for 480 kHz and/or 960 kHz SCS. In addition, increasing SCS to 480 kHz and/or 960 kHz from frequencies greater than 52.6 GHz or higher may cause a random access (RA) radio network temporary identifier (RNTI), which is a function of a time and frequency of a PRACH occasion the preamble is detected on according to equation [1], shortage, e.g., by exceeding a 16-bit width of RA-RNTI in current systems.

$$\text{RA-RNTI}=1+s_{id}+14(t_{id}+80(f_{id}+8ul\_carrier_{id})) \qquad [1]$$

Note that in equation [1], $s_{id}$ is an index of a first orthogonal frequency division multiplexed (OFDM) symbol of a specified PRACH, $t_{id}$ is an index of a first slot of the specified PRACH in a system frame, $f_{id}$ is an index of the specified PRACH in the frequency domain, and $ul\_carrier_{id}$ is an uplink carrier used for Msg 1 transmission. Note that $s_{id}$ is a value ranging from 0 to less than 14, $t_{id}$ is a value ranging from 0 to less than 80, $f_{id}$ is a value ranging from 0 to less than 8, and $ul\_carrier_{id}$ has a value of 0 for a normal uplink (NUL) carrier and 1 for a supplementary uplink (SUL) carrier.

Embodiments described herein provide systems, methods, and mechanisms to support downlink control resources sets and RACH procedures during initial access in wireless communication. For example, embodiments may include systems, methods, and mechanisms for CORESET#0 configuration, SSB/CORESET #0 multiplexing pattern 1 for mixed SCS, time-domain ROs determination for 480 kHz/960 kHz SCSs, and RA-RNTI determination for 480 kHz/960 kHz SCSs. For example, embodiments described herein allow a UE and network to address the above described issues by implementing support for expanded resource block support for CORESET #0 as well as addressing scheduling support for higher SCS support (e.g., for 480 kHz/960 kHz SCSs). Further, embodiments allow a UE to determine a bandwidth of a CORESET #0 as well as allowing the UE to support mixed numerologies between SSB, e.g., between 120 kHz SCS and 480 kHz SCS Type0-PDCCH/SIB1 transmission or multiplexing pattern 1. In addition, embodiments allow a UE to determine ROs for 480 kHz and/or 960 kHz SCS and to avoid an RA-RNTI shortage. For example, a number of resource blocks (RBs) for SIB-1 transmission supported by CORESET #0 may be expanded from 24 physical RBs (PRBs) or 48 PRBs to 96 PRBs for one or multiple of 120 kHz, 480 kHz, and/or 960 kHz SCS. Note that in addition to an increase of supported PRBs, a larger aggregation level (e.g., such as AL-16) for PDCCH transmission may also be supported to extend coverage of PDCCH. As illustrated in FIG. 8, an existing table defining a set of RBs and slot symbols of CORESET for Type0-PDCCH search space set when {SS/PBCH block, PDCCH} SCS is defined as {120, 120} kHz may be modified to include 96 PRBs with 1 or 2 symbols. Thus, as shown in FIG. 8, index 8 may correspond to an SSB and CORESET multiplexing pattern of 1 with 96 PRBs, 1 symbol, and an offset of 38 RBs. Additionally, index 9 may correspond to an SSB and CORESET multiplexing pattern of 1 with 96 PRBs, 2 symbols, and an offset of 38 RBs.

Figure 9:
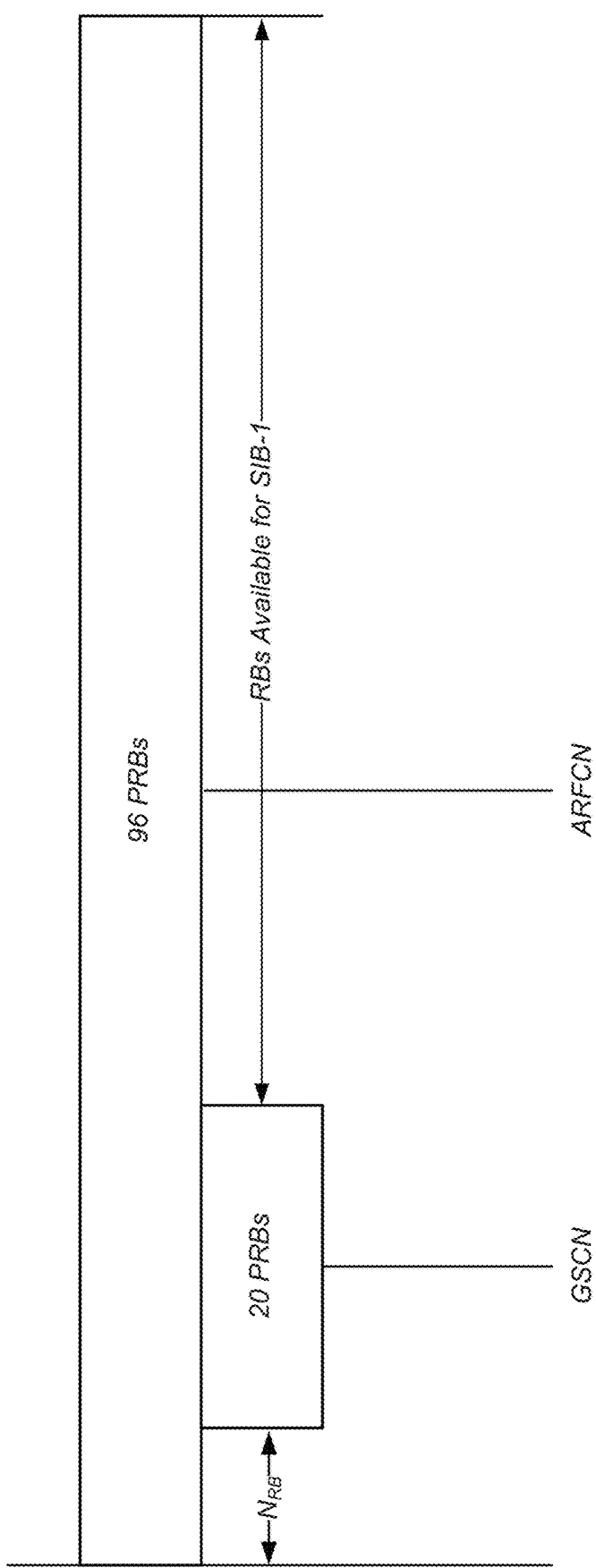
FIG. 9 illustrates an example of a resource block offset, according to some embodiments.

As another example, a set of RB offset values may be defined for 120 kHz, 240 kHz, and 480 kHz SCS based on synchronization raster (e.g., global synchronization channel number (GSCN)) and/or component carrier (CC) raster (e.g., absolute radio frequency channel number (ARFCN)) such that an SSB is located closer to an edge of a CC, e.g., as illustrated by FIG. 9. As shown, an RB offset (e.g., NRB) may be defined based on the synchronization raster (e.g., GSCN) thereby allocating RBs closer to the edge of a CC for SIB-1 transmission. In addition, subcarrier alignment of SSB raster and channel raster points may be fulfilled. Note that such a design may maximize a number of resource elements (REs) available for SIB-1 considering that SIB-1 may be scheduled by DCI Format 1_0 with contiguous resource allocation in the frequency domain. Further, a set of common RB offsets may be applied for all of SSB SCSs, e.g., for 120 kHz, 240 kHz, 480 kHz, and/or 960 kHz SCS. Thus, as illustrated by FIG. 10, a set of resource blocks and slot symbols of CORESET for Type0-PDCCH search space set may include RB offsets of 0, 1, 2, or 4 RBs and/or a subset of these values, e.g., such as 0, 2 or 1, 4. Thus, an index value of the table illustrated by FIG. 10 may be used to indicate an offset.

Figure 11:
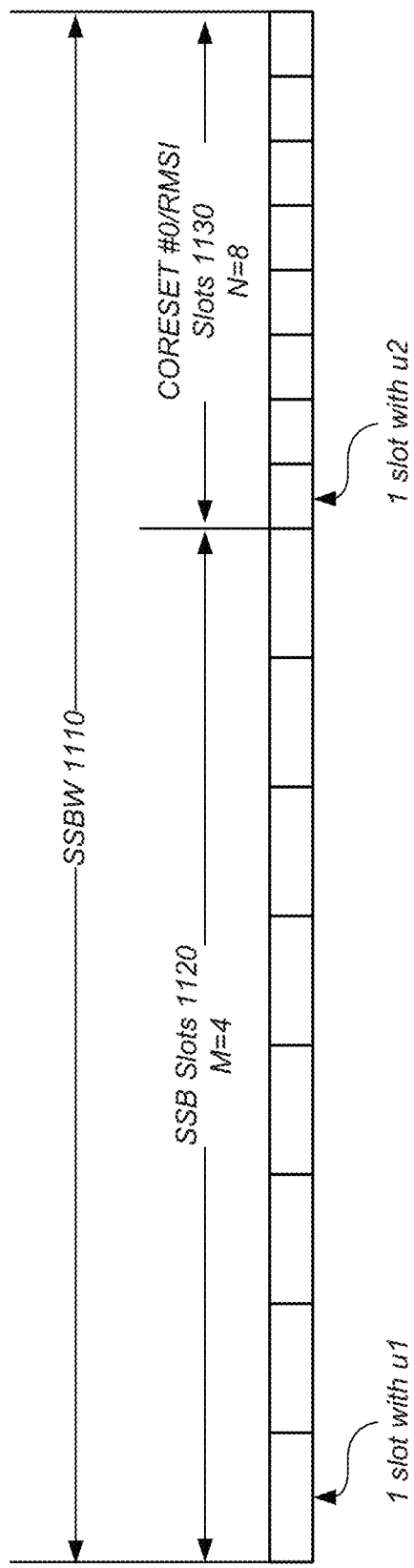
FIGS. 11 and 12 illustrate examples of multiplexing patterns that may be used to transmit CORESET #0/RMSI with larger SCS, according to some embodiments.
Figure 12:
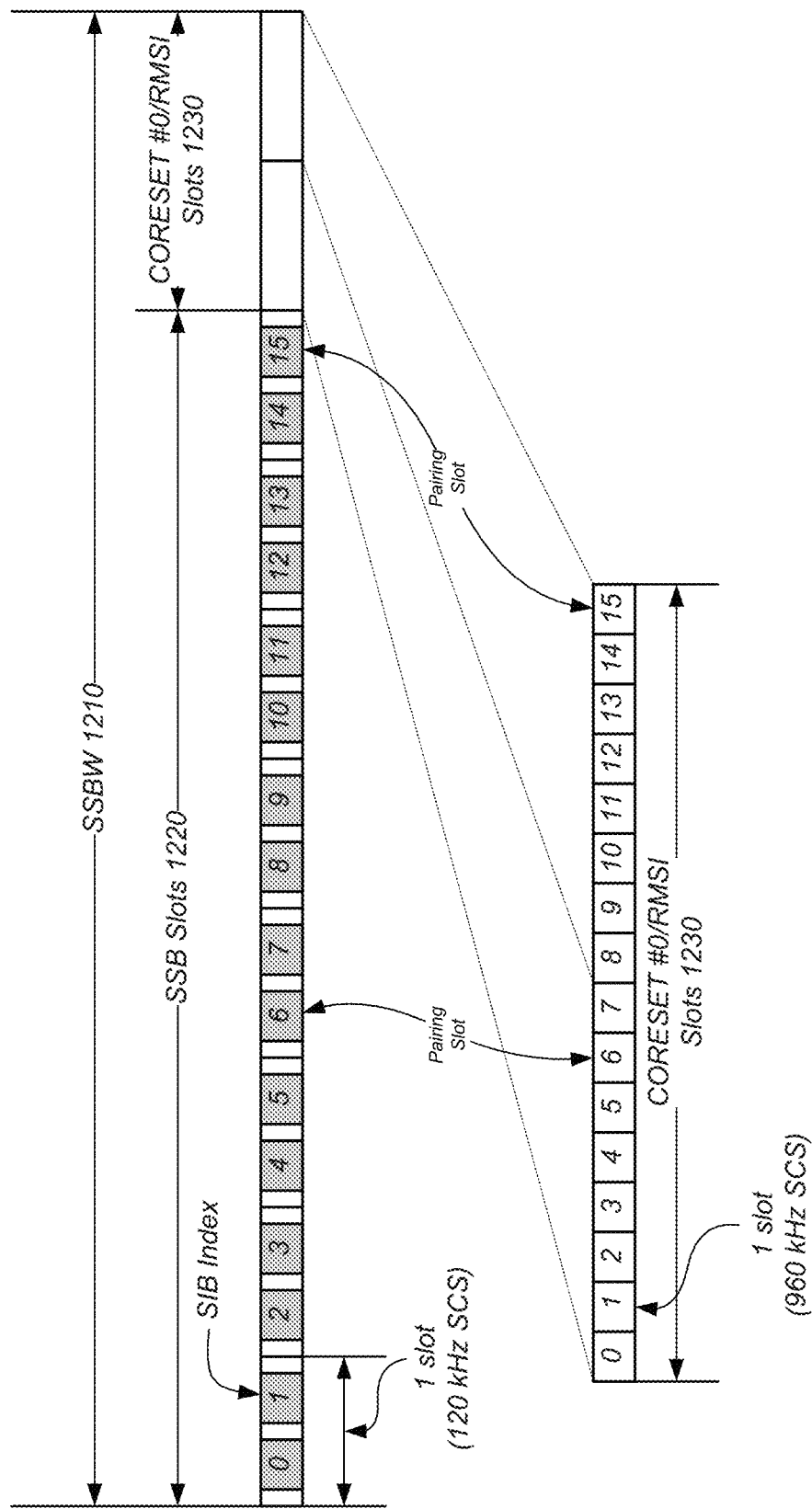

As a further example, a multiplexing pattern in the time domain may be used to transmit CORESET #0/RMSI with larger SCS (e.g., 480 kHz and/or 960 kHz) in slots that are not used for SSB transmission with smaller SCS (e.g., 120 kHz). Such a multiplexing pattern may reduce latency of remaining minimum system information (RMSI) acquisition by using larger SCSs and quite short slot duration which may make it possible to multiplex RMSIs into gaps between SSB bursts. Additionally, such a multiplexing pattern may allow an operator to use a single higher numerology (e.g., 960 kHz) SCS for all channels (e.g., CORESETs including CORESET #0, RMSI over PDSCH, CSI-RS, and/or unicast PDCCH/PDSCH) except the SSB. FIGS. 11 and 12 further illustrate such a multiplexing pattern.

As shown in FIG. 11, an SSB burst window (SSBW), e.g., such as SSBW 1110, may include a first M consecutive SSB slots, e.g., such as SSB slots 1120, where M equals 4, followed by a second N consecutive CORESET0/RMSI slots, e.g., such as CORESET0/RMSI slots 1130, where N equals 8. Note that an SSB slot may have a first SCS, e.g., $u_1$, and include two SSB transmissions. Note additionally, that a CORESET0/RMSI slot may a second SCS, e.g., $u_2$, and may be reserved for a CORESET0/RMSI transmission(s) that has a one-to-one association (or correspondence) with an SSB transmitted in SSB slots with a same SSBW. In some embodiments, values of an <M, N> pair may be specified for different combinations of <$u_1$, $u_2$>. For example, referring back to FIG. 11, <M, N> may be <4, 8> when <$u_1$, $u_2$> is <3, 5>. As another example, <M, N> may be <4, 16> when <$u_1$, $u_2$> is <3, 6>.

In some embodiments, an association between CORESET0/RMSI and SSB within a SSBW may be defined based, at least in part, on an SSB's SCS. For example, for an SSB with 120 kHz SCS, the first symbols of candidate synchronization signal (SS)/physical broadcast channel (PBCH) blocks may have indexes {4, 8, 16, 20}+28n, where n may equal 0, 1, 3, 5, 6, 7, 8, 10, 11, 12, 13, 15,16, 17, 18, and where n may be defined with 120 kHz SCS. As another example, for CORESET0/RMSI with 480 kHz SCS and/or 960 kHz SCS, a UE may monitor PDCCH in a Type0-PDCCH CSS set in slot $n_0$ that may be associated with an SSB with index i. In some embodiments no may be defined as $n_0 = \lfloor i*M \rfloor$, where, for $u_2$ equal to 5, M may equal ½ and, for $u_2$ equal to 6, M may equal 1. Note that slots of CORESET0/RMSI using SCS $u_2$ may be indexed every SSBBW starting from $n_0$=0. In addition, denoting a first symbol index of Type0-PDCCH CSS set for SSB index i as $k_i$, if M=½, then $k_i$ may be 0 if i is even and $k_i$ may be 7 is i is odd. Additionally, if M=1, $k_i$ may be 0.

FIG. 12 illustrates an example of SSB and CORESET0/RMSI multiplexing with differing SCSs when <$u_1$, $u_2$> is <3, 6>. As shown, CORESET0/RMSIs associated with SSBs transmitted with $u_1$=3 in SSB slots 1220 within a SSBW 1210 may be transmitted in CORESET#0/RMSIs slot 1230 using SCS $u_2$=6. Thus, as described above, a UE may monitor PDCCH in the Type0-PDCCH CSS set associated with SSB #6/#15 in CORESET0/RMSI slot index #6/#15, respectively.

In some embodiments, at least a same density (e.g., number of PRACH slots per reference slot) as for 120 kHz PRACH in FR2 may be supported. In addition, a starting position of RACH Occasions (Ros) with $\Delta f_{RA} \in \{480, 960\}$ kHz in a reference slot may be determined. In some embodiments, the reference slot may be defined using a reference SCS of 60 kHz or 120 kHz. As an example, ROs may be distributed across slots within each PRACH slot of a reference SCS. In such instances, a UE may determine a valid PRACH slot with reference SCS (e.g., either 60 kHz or 120 kHz SCS) based on a PRACH configuration index in Table 6.3.3.2-4 given by a higher-layer parameter prach-ConfigurationIndex. Then, the UE may determine a slot index with $\Delta f_{RA} \in \{480, 960\}$ kHz with the valid PRACH slot with reference SCS. In some instances, a number of slots of SCS u=5, 6 in a PRACH slot of reference SCS $u_0$=2, 3 may be denoted as $M_{u_0}^u$. For example, for u=5 (480 kHz), $M_2^5$=8 and $M_3^5$=4. As another example, for u=6 (960 kHz), $M_2^6$=16 and $M_3^6$=8. Additionally, a number of time-domain ROs within a reference slot may be denoted as N. Then, when $N \leq M_{u_0}^u$, the N ROs may be evenly distributed over a last N slots in the reference PRACH slot with each RO per slot and using a same starting symbol configured by higher layers for each slot. Further, when $N > M_{u_0}^u$, the ROs may be evenly distributed over all of $M_{u_0}^u$ slots in the reference slot. In addition, M1 may be defined as M1=mod(N, $M_{u_0}^u$), $K_1$ may be defined as $K_1 = \lceil (N/M_{u_0}^u) \rceil$, $K_2$ may be defined as $K_2 = \lfloor (N/M_{u_0}^u) \rfloor$. Then, if M1>0, there may be M1 slots of $K_1$ ROs. In addition, (M-M1) slots within a reference slot may include $K_2$ per slot. In some embodiments, a location of M1 consecutive slots including $K_1$>1 ROs per slot may be provided in various manners. For example, a slot index may be specified by a standard, e.g., the slot index may be either a first or a last M1 slots within the reference PRACH slot. As another example, a slot index may be explicitly provided using a bitmap in SIB1 with one-to-one mapping between bit fields and slots in a reference slot. Further, a symbol position l of $K_1$>1 ROs in each of M1 consecutive slots may be determined by determining and numbering candidate ROs within a slot in increasing order from 0 to Q−1 where Q may be given by a higher layer parameter such as prach-ConfigurationIndex, e.g., based on Table 6.3.3.2-4. Note that a first $K_1$>1 even candidate ROs may be considered valid ROs.

As another example, ROs may be configured by higher layers and may be located in a last slot within a reference PRACH slot window.

Figure 13A:
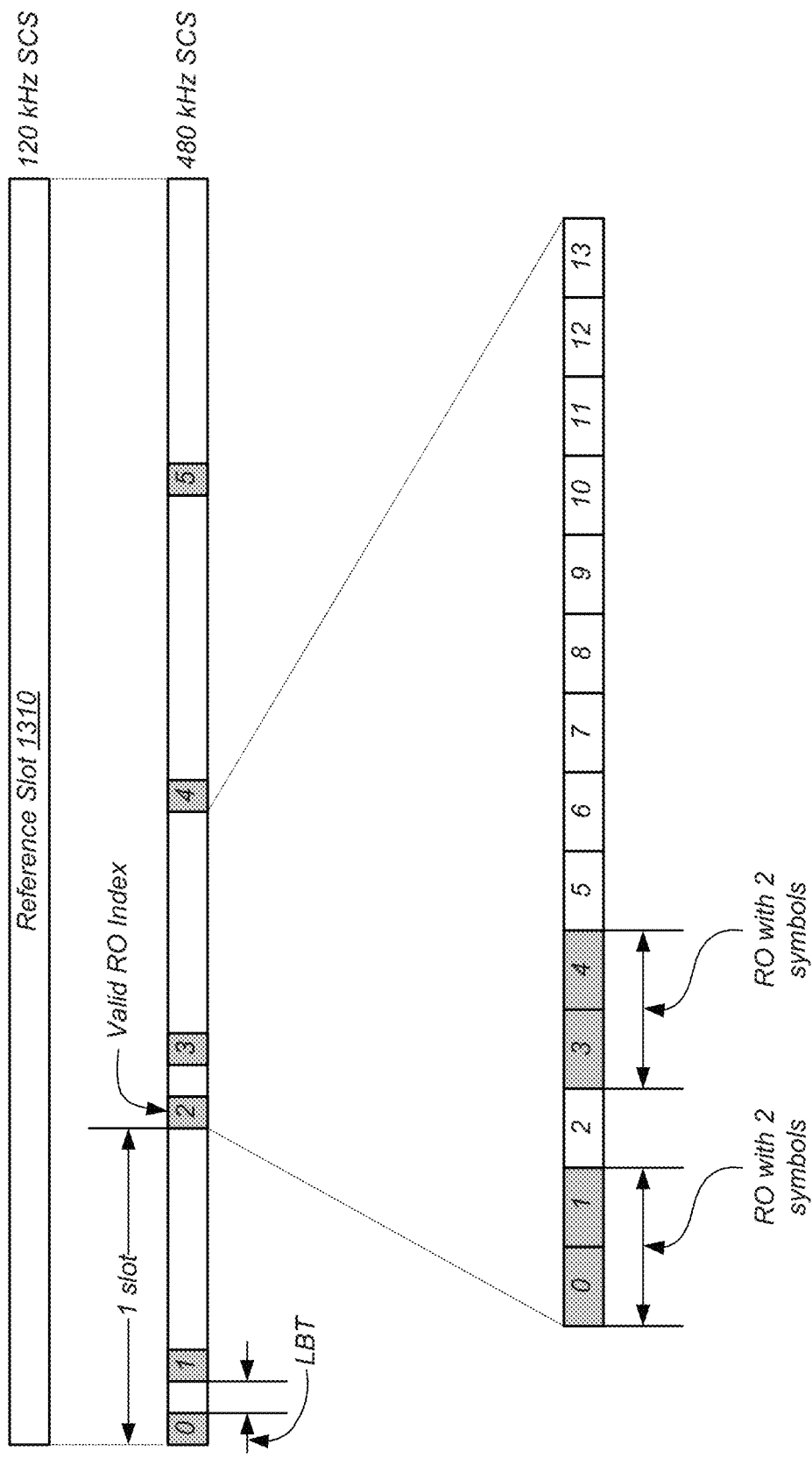
FIGS. 13A and 13B illustrate examples of time-domain ROs determination, according to some embodiments.
Figure 13B:
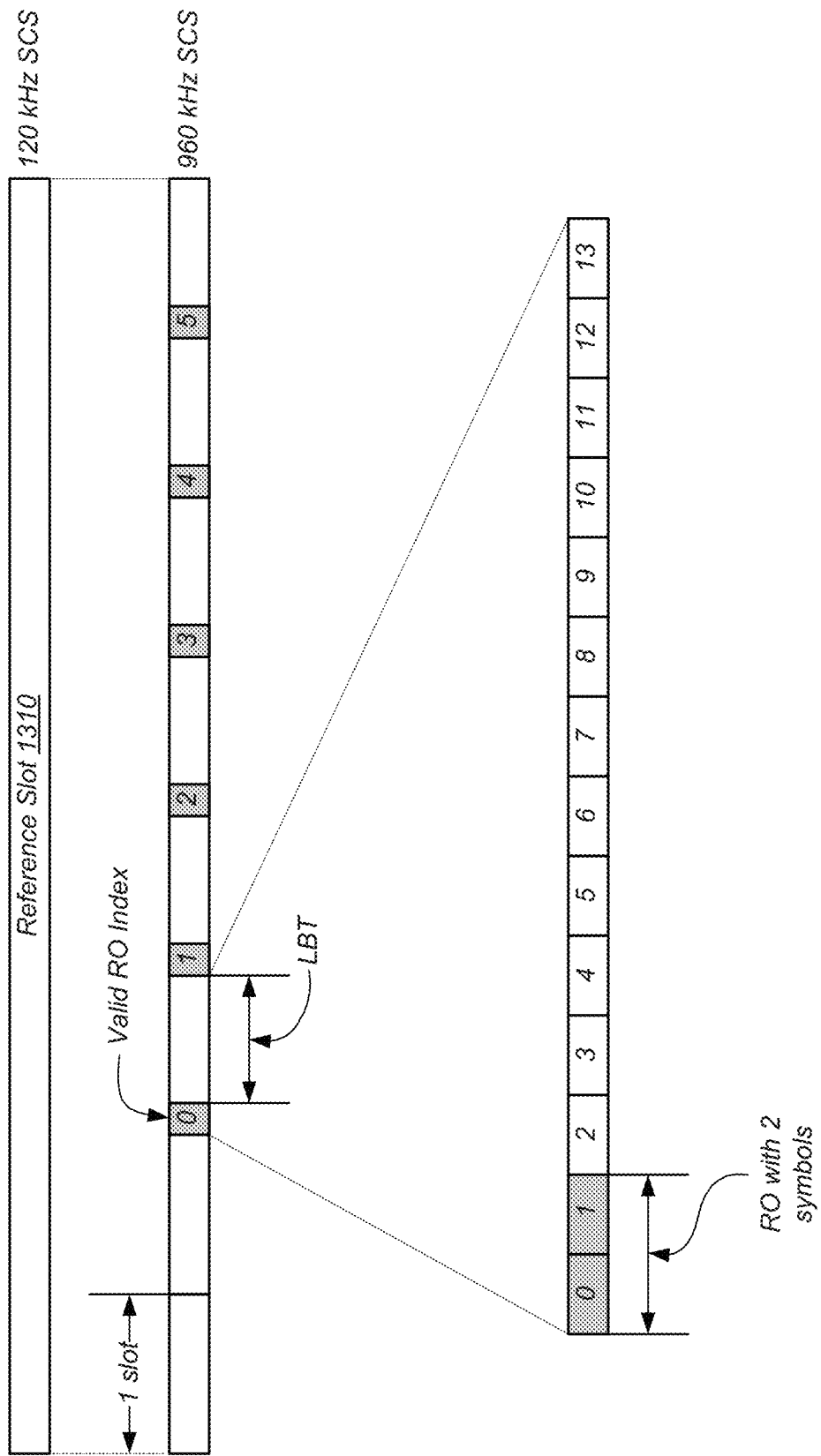

FIGS. 13A and 13B illustrate examples of time-domain ROs determination, according to some embodiments. As shown, a reference SCS is assumed to be 120 kHz SCS for PRACH configuration. Additionally, higher-layer parameter prach-ConfigurationIndex may have a value of 13 and PRAHC format may be A1. In addition, there may be a total of N=6 ROs within a PRACH slot with 60 kHz SCS. As shown in FIG. 13A, the 6 ROs may be evenly distributed across 4 (e.g., M) slots for 480 kHz SCS. Thus, for $N > M_{u_0}^u$, e.g., 6>4, the 6 ROs may be distributed over the 4 slots with <2, 2, 1, 1> ROs, respectively. As shown in FIG. 13B, the 6 ROs may be evenly distributed across 8 (e.g., M) slots for 960 kHz SCS. Thus, for $N \leq M_{u_0}^u$, e.g., 6≤8, the 6 ROs may be distributed in the last 6 slots of 8 slots in the PRACH slot of 120 kHz SCS.

Figure 14A:
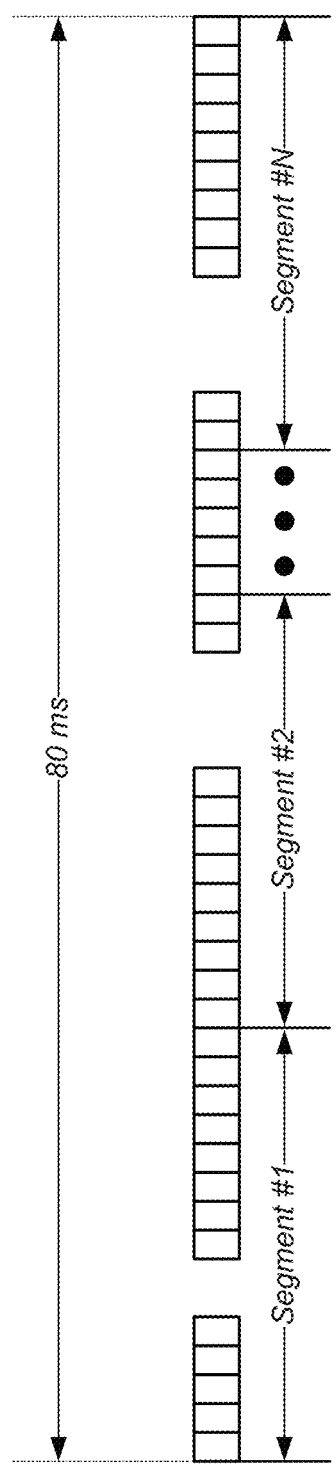
FIG. 14A illustrates another example of time-domain ROs determination, according to some embodiments.

As a yet further example, a PRACH transmission window may be divided into N slots subgroups with each subgroup including M slots. The subgroup (or segment index) of a corresponding RO may be signaled by DCI format 1_0 that schedules RACH response (RAR) transmission. In some embodiments, N may be set to a value of 4, 8 for 480 kHz and 960 kHz, respectively. In some instances, a segment index may be signaled through a DCI that schedules the RAR transmission. For example, one field of the DCI may be adding (e.g., 2 or 3 bits) from reserved bits. As another example, least significant bits (LSBs) of a sequence frame number (SFN) information element (ID) may be introduced for DCI Format 1_0 with CRC scrambled by RA-RNTI, e.g., as illustrated by FIG. 14A. In some instances, a segment index may be divided into two parts, e.g., part 1 and part 2. Part 1 may include a payload of DCI Format 1_0 with CRC scrambled by RA-RNTI. Part 2 may be conveyed by selecting one of scrambling sequences [$w_0, w_1, \ldots, w_{23}$] to scramble the CRC bits of DCI Format 1_0 as shown in FIG. 14B.

Figure 15:
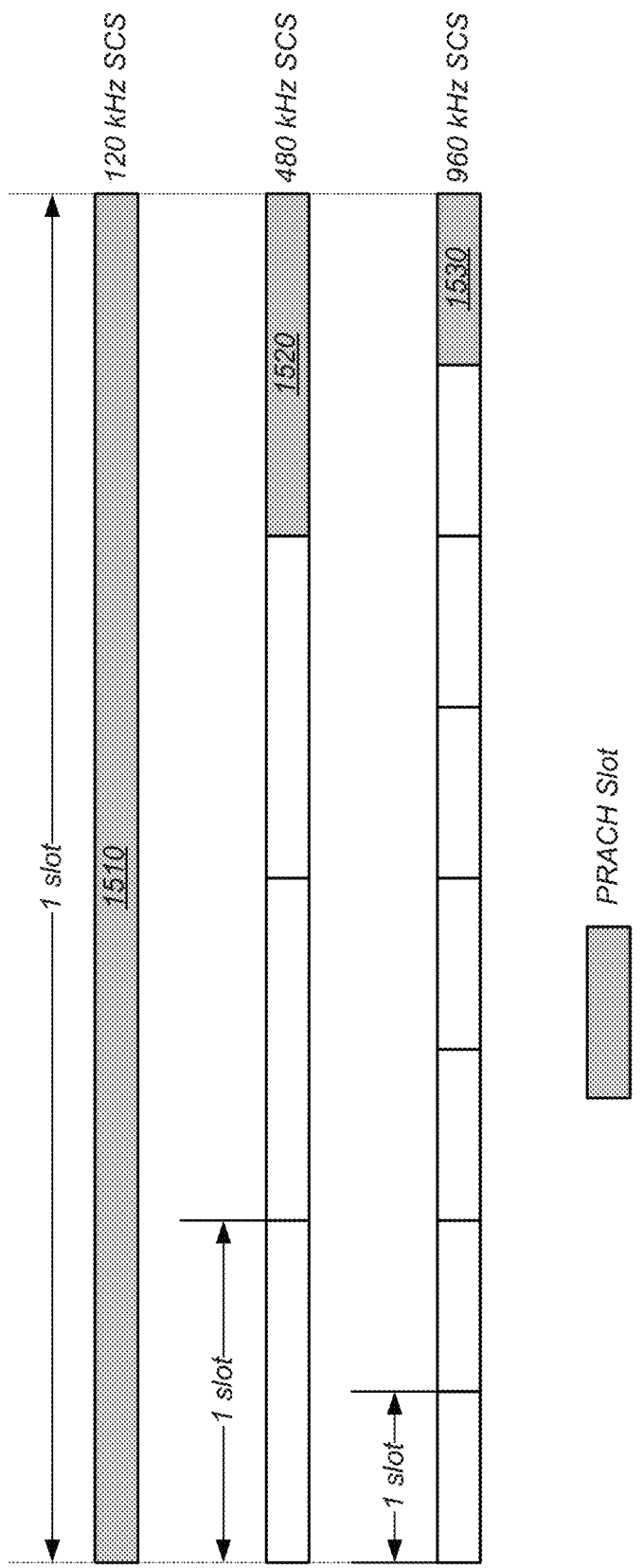
FIG. 15 illustrates an example of RA-RNTI determination, according to some embodiments.

Alternatively, equation [1] may be modified to include an additional weighting parameter based on a reference slot with a reference SCS, $u_{ref}$, and $t_{id}$ is an index of a first slot of a PRACH occasion with numerology, u, e.g.:

$$\text{RA-RNTI} = 1 + s_{id} + 14(\alpha t_{id} + 80(f_{id} + 8ul_{carrier_{id}}))  \quad [2]$$

$$\alpha = 2^{(u_{ref} - u)} \quad [3]$$

where $u_{ref}$ may have a value of 3 for 480 kHz SCS and 960 kHz SCS and u may have a value of 5 for 480 kHz SCS and 6 for 960 kHz SCS. Note that such a weighting parameter may only be used when there is only one RO for a 480 kHz and 960 kHz SCS within a reference slot, e.g., 120 kHz SCS. For example, as illustrated by FIG. 15, a UE may calculate an RA-RNTI based on an index of slot 1510, which may be a reference slot with 120 kHz SCS, for an RO 1520, associated with a 480 kHz SCS, and an RO 1530, associated with a 960 kHz SCS. Such an approach any ensure that an RA-RNTI may be within the 16-bits range thereby by mitigating any RA-RNTI overflow issue.

Figure 16:
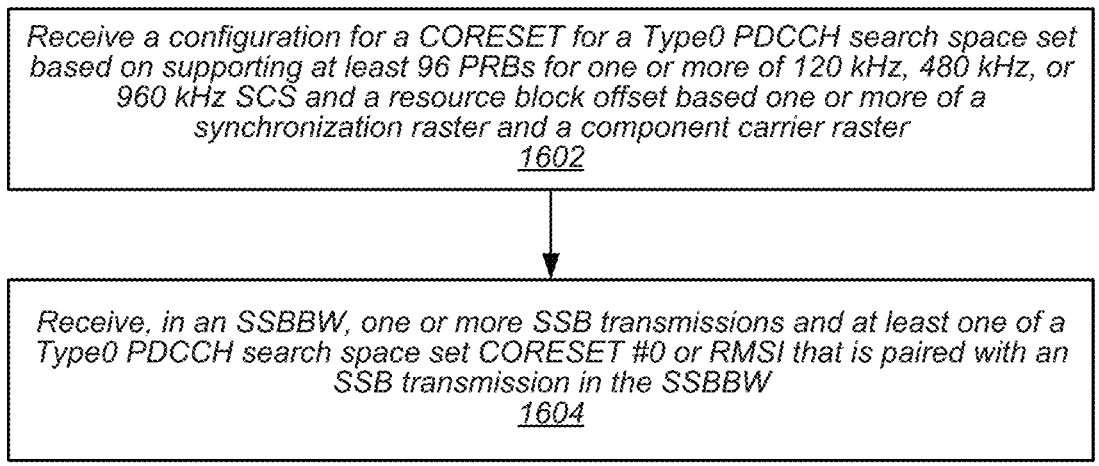
FIGS. 16-19 illustrate examples of block diagrams for methods for configuring initial access communications, according to some embodiments.

FIG. 16 illustrates an example of a block diagram for a method for configuring initial access communications, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may configure and/or receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS) and a resource block offset based one or more of a synchronization raster and a component carrier raster. The configuration for a CORESET by a data structure that includes one or more indexes. Each index of the one or more indexes may specify an SSB and CORESET multiplexing pattern, a number of PRBs for the CORESET, a number of symbols for the CORESET, and an offset between a smallest resource block (RB) index of the CORESET and a smallest RB of a corresponding SSB. Additionally, indexes with a value of 8 and/or 9 may indicate CORESET configurations including 96 PRBs. In some instances, the resource block offset may be applied for all SCSs or a subset of SCSs, e.g., a subset of 120 kHz, 480 kHz, and 960 kHz SCSs. For example, the resource block offset may be specified as [0, 1, 2, 4] and/or as [0, 2].

At 1604, the UE may receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the SSBBW.

In some embodiments, the UE may monitor a Type0 physical downlink control channel (PDCCH) search space set in at least one of the CORESET #0 or RMSI slot that is paired with an SSB index of the one or more SSB transmissions within the SSBBW.

In some embodiments, the one or more SSB transmissions may be received in an SSB slot in the SSBBW with a first SCS. Additionally, the Type0 PDCCH search space set for RMSI scheduling may be monitored in a CORESET0/RMSI slot in the SSBBW with a second SCS. Note that there may be is a one-to-one association between SSBs transmitted in the SSB slot in the SSBBW and the Type0 PDCCH search space set for the UE to monitor in the CORESET0/RMSI slot in the SSBBW.

In addition, the SSB slots may include a first M consecutive slots of the SSBBW with a first SCS and the CORESET0/RMSI slots may include a subsequent N consecutive slots of the SSBBW with a second SCS. In some instances, values of <M, N> pairs may be specified for various combinations of first SCSs and second SCSs. Note that the first SCS may be smaller than the second SCS.

In some embodiments, the UE may determine positions of random access channel (RACH) occasion (RO) slots with a third SCS within a physical RACH (PRACH) slot of a reference sub-carrier spacing (SCS) based on a configuration index included in a higher layer parameter. Additionally, the UE may determine a distribution of ROs with the third SCS based on a total number of time domain ROs in the PRACH slot of the reference SCS. The third SCS may be one of a 480 kHz SCS or a 960 kHz SCS, which may be larger than the reference SCS of the PRACH slot. In addition, when a number of slots of the third SCS in a PRACH slot of a reference SCS are greater than or equal to the total number of time-domain ROs, N, within a reference slot, the time-domain ROs with the third SCS may be evenly distributed over a last N slots of the third SCS in the reference slot of the reference SCS with one RO per slot of the third SCS. Note that each time-domain RO may use a same starting symbol in a slot of the third SCS. Further, the starting symbol may be configured via higher layers for each slot of the third SCS. Additionally, when a number of slots of the third SCS in a PRACH slot of a reference SCS is less than a number of time-domain ROs, N, within a reference slot, the time-domain ROs may be distributed over all slots of the third SCS in a reference slot. Note that each of the first $M_1$ slots may include $K_1$ ROs and each of the subsequent $M_2$ slots may include $K_2$ ROs, where $$M_1 = \mathrm{mod}(N, Q),$$

$$K_1 = \mathrm{ceiling}\left(\frac{N}{Q}\right), \text{ and}$$

$$M_2 = N - M_1,$$

$$K2 = \mathrm{floor}\left(\frac{N}{Q}\right),$$

Q represents the number of slots of the third SCS in a PRACH slot of the reference SCS. In some embodiments, when a number of slots of the third SCS in a PRACH slot of a reference SCS is less than a number of time-domain ROs, N, within a reference slot, the time-domain ROs may be located in a last slot of the third SCS of a reference slot window.

In some embodiments, the UE may receive, via a downlink control indicator (DCI) format 1_0 that schedules random access channel (RACH) response (RAR) transmissions, a segment index of a corresponding RACH occasion (RO). The segment index may be based, at least in part, on a sub-carrier spacing (SCS). Additionally, the UE may determine a random access (RA) radio network temporary identifier (RNTI) based on a physical random access channel (PRACH) transmission window being divided into a number of slot sub-groups. Note that the number of slot sub-groups may be based on the SCS of the RO and may determine the segment index. In some instances, the segment index may be a field of the DCI format 1_0 that schedules RAR transmissions. In some instances, the segment index may be indicated via least significant bits (LSBs) of a sequence frame number (SNF) information element (IE) of the DCI Format 1_0 that schedules RAR transmissions. In some instances, the segment index may be indicated by a first part and a second part. The first part may be included in a payload of DCI Format 1_0 with CRC scrambled by RA-RNTI. The second part may be conveyed by selecting a scrambling sequence to scramble CRC bits of DCI Format 1_0. Additionally, the first part may indicate an index associated with the scrambling sequence. In some embodiments, the RA-RNTI associated with an RO may be determined based on a reference SCS that is larger than the SCS of the RO.

Figure 17:
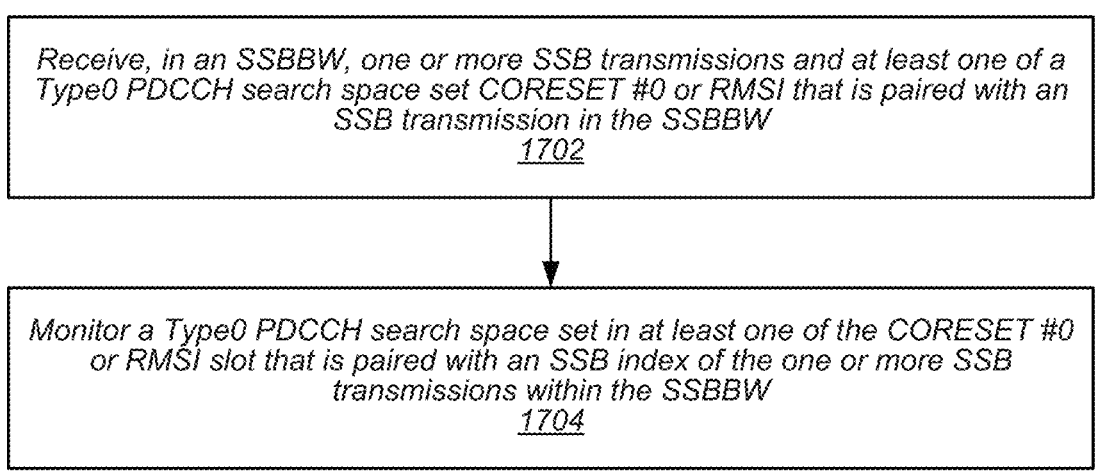

FIG. 17 illustrates another example of a block diagram for a method for configuring initial access communications, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW, e.g., based on the configuration and resource block offset.

At 1704, the UE may monitor a Type0 physical downlink control channel (PDCCH) search space set in at least one of the CORESET #0 or RMSI slot that is paired with an SSB index of the one or more SSB transmissions within the SSBBW.

In some embodiments, the one or more SSB transmissions may be received in an SSB slot in the SSBBW with a first SCS. Additionally, the Type0 PDCCH search space set for RMSI scheduling may be monitored in a CORESET0/RMSI slot in the SSBBW with a second SCS. Note that there may be is a one-to-one association between SSBs transmitted in the SSB slot in the SSBBW and the Type0 PDCCH search space set for the UE to monitor in the CORESET0/RMSI slot in the SSBBW.

In addition, the SSB slots may include a first M consecutive slots of the SSBBW with a first SCS and the CORESET0/RMSI slots may include a subsequent N consecutive slots of the SSBBW with a second SCS. In some instances, values of <M, N> pairs may be specified for various combinations of first SCSs and second SCSs. Note that the first SCS may be smaller than the second SCS.

In some embodiments, the UE may configure and/or receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS) and a resource block offset based one or more of a synchronization raster and a component carrier raster. The configuration for a CORESET by a data structure that includes one or more indexes. Each index of the one or more indexes may specify an SSB and CORESET multiplexing pattern, a number of PRBs for the CORESET, a number of symbols for the CORESET, and an offset between a smallest resource block (RB) index of the CORESET and a smallest RB of a corresponding SSB. Additionally, indexes with a value of 8 and/or 9 may indicate CORESET configurations including 96 PRBs. In some instances, the resource block offset may be applied for all SCSs or a subset of SCSs, e.g., a subset of 120 kHz, 480 kHz, and 960 kHz SCSs. For example, the resource block offset may be specified as [0, 1, 2, 4] and/or as [0, 2].

In some embodiments, the UE may determine positions of random access channel (RACH) occasion (RO) slots with a third SCS within a physical RACH (PRACH) slot of a reference sub-carrier spacing (SCS) based on a configuration index included in a higher layer parameter. Additionally, the UE may determine a distribution of ROs with the third SCS based on a total number of time domain ROs in the PRACH slot of the reference SCS. The third SCS may be one of a 480 kHz SCS or a 960 kHz SCS, which may be larger than the reference SCS of the PRACH slot. In addition, when a number of slots of the third SCS in a PRACH slot of a reference SCS are greater than or equal to the total number of time-domain ROs, N, within a reference slot, the time-domain ROs with the third SCS may be evenly distributed over a last N slots of the third SCS in the reference slot of the reference SCS with one RO per slot of the third SCS. Note that each time-domain RO may use a same starting symbol in a slot of the third SCS. Further, the starting symbol may be configured via higher layers for each slot of the third SCS. Additionally, when a number of slots of the third SCS in a PRACH slot of a reference SCS is less than a number of time-domain ROs, N, within a reference slot, the time-domain ROs may be distributed over all slots of the third SCS in a reference slot. Note that each of the first $M_1$ slots may include $K_1$ ROs and each of the subsequent $M_2$ slots may include $K_2$ ROs, where $$M_1 = \mod(N, Q),$$

$$K_1 = \text{ceiling}\left(\frac{N}{Q}\right), \text{ and}$$

$$M_2 = N - M_1,$$

$$K2 = \text{floor}\left(\frac{N}{Q}\right),$$

Q represents the number of slots of the third SCS in a PRACH slot of the reference SCS. In some embodiments, when a number of slots of the third SCS in a PRACH slot of a reference SCS is less than a number of time-domain ROs, N, within a reference slot, the time-domain ROs may be located in a last slot of the third SCS of a reference slot window.

In some embodiments, the UE may receive, via a downlink control indicator (DCI) format 1_0 that schedules random access channel (RACH) response (RAR) transmissions, a segment index of a corresponding RACH occasion (RO). The segment index may be based, at least in part, on a sub-carrier spacing (SCS). Additionally, the UE may determine a random access (RA) radio network temporary identifier (RNTI) based on a physical random access channel (PRACH) transmission window being divided into a number of slot sub-groups. Note that the number of slot sub-groups may be based on the SCS of the RO and may determine the segment index. In some instances, the segment index may be a field of the DCI format 1_0 that schedules RAR transmissions. In some instances, the segment index may be indicated via least significant bits (LSBs) of a sequence frame number (SNF) information element (IE) of the DCI Format 1_0 that schedules RAR transmissions. In some instances, the segment index may be indicated by a first part and a second part. The first part may be included in a payload of DCI Format 1_0 with CRC scrambled by RA-RNTI. The second part may be conveyed by selecting a scrambling sequence to scramble CRC bits of DCI Format 1_0. Additionally, the first part may indicate an index associated with the scrambling sequence. In some embodiments, the RA-RNTI associated with an RO may be determined based on a reference SCS that is larger than the SCS of the RO.

Figure 18:
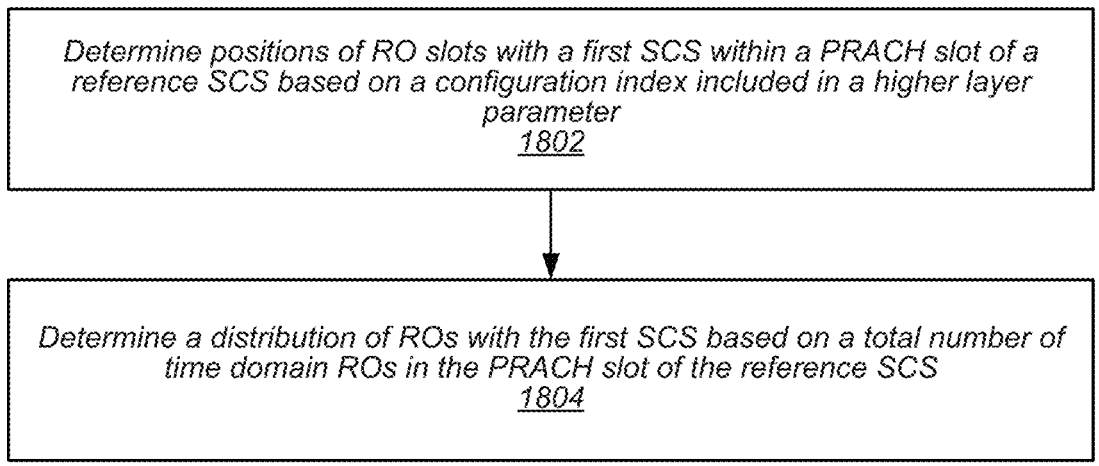

FIG. 18 illustrates yet another example of a block diagram for a method for initial access communications, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, may determine positions of random access channel (RACH) occasion (RO) slots with a first SCS within a physical RACH (PRACH) slot of a reference sub-carrier spacing (SCS) based on a configuration index included in a higher layer parameter.

At 1804, the UE may determine a distribution of ROs with the first SCS based on a total number of time domain ROs in the PRACH slot of the reference SCS. The first SCS may be one of a 480 kHz SCS or a 960 kHz SCS, which may be larger than the reference SCS of the PRACH slot. In addition, when a number of slots of the first SCS in a PRACH slot of a reference SCS are greater than or equal to the total number of time-domain ROs, N, within a reference slot, the time-domain ROs with the first SCS may be evenly distributed over a last N slots of the first SCS in the reference slot of the reference SCS with one RO per slot of the first SCS. Note that each time-domain RO may use a same starting symbol in a slot of the first SCS. Further, the starting symbol may be configured via higher layers for each slot of the first SCS. Additionally, when a number of slots of the first SCS in a PRACH slot of a reference SCS is less than a number of time-domain ROs, N, within a reference slot, the time-domain ROs may be distributed over all slots of the first SCS in a reference slot. Note that each of the first $M_1$ slots may include $K_1$ ROs and each of the subsequent $M_2$ slots may include $K_2$ ROs, where $$M_1 = \mathrm{mod}(N, Q),$$

$$K_1 = \mathrm{ceiling}\left(\frac{N}{Q}\right), \text{ and}$$

$$M_2 = N - M_1,$$

$$K2 = \mathrm{floor}\left(\frac{N}{Q}\right).$$

Q represents the number of slots of the first SCS in a PRACH slot of the reference SCS. In some embodiments, when a number of slots of the first SCS in a PRACH slot of a reference SCS is less than a number of time-domain ROs, N, within a reference slot, the time-domain ROs may be located in a last slot of the first SCS of a reference slot window.

In some embodiments, the UE may configure and/or receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS) and a resource block offset based one or more of a synchronization raster and a component carrier raster. The configuration for a CORESET by a data structure that includes one or more indexes. Each index of the one or more indexes may specify an SSB and CORESET multiplexing pattern, a number of PRBs for the CORESET, a number of symbols for the CORESET, and an offset between a smallest resource block (RB) index of the CORESET and a smallest RB of a corresponding SSB. Additionally, indexes with a value of 8 and/or 9 may indicate CORESET configurations including 96 PRBs. In some instances, the resource block offset may be applied for all SCSs or a subset of SCSs, e.g., a subset of 120 kHz, 480 kHz, and 960 kHz SCSs. For example, the resource block offset may be specified as [0, 1, 2, 4] and/or as [0, 2].

In some embodiments, the UE may receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW, e.g., based on the configuration and resource block offset. Further, the UE may monitor a Type0 physical downlink control channel (PDCCH) search space set in at least one of the CORESET #0 or RMSI slot that is paired with an SSB index of the one or more SSB transmissions within the SSBBW.

In some embodiments, the one or more SSB transmissions may be received in an SSB slot in the SSBBW with a first SCS. Additionally, the Type0 PDCCH search space set for RMSI scheduling may be monitored in a CORESET0/RMSI slot in the SSBBW with a second SCS. Note that there may be is a one-to-one association between SSBs transmitted in the SSB slot in the SSBBW and the Type0 PDCCH search space set for the UE to monitor in the CORESET0/RMSI slot in the SSBBW.

In addition, the SSB slots may include a first M consecutive slots of the SSBBW with a first SCS and the CORESET0/RMSI slots may include a subsequent N consecutive slots of the SSBBW with a second SCS. In some instances, values of <M, N> pairs may be specified for various combinations of first SCSs and second SCSs. Note that the first SCS may be smaller than the second SCS.

In some embodiments, the UE may receive, via a downlink control indicator (DCI) format 1_0 that schedules random access channel (RACH) response (RAR) transmissions, a segment index of a corresponding RACH occasion (RO). The segment index may be based, at least in part, on a sub-carrier spacing (SCS). Additionally, the UE may determine a random access (RA) radio network temporary identifier (RNTI) based on a physical random access channel (PRACH) transmission window being divided into a number of slot sub-groups. Note that the number of slot sub-groups may be based on the SCS of the RO and may determine the segment index. In some instances, the segment index may be a field of the DCI format 1_0 that schedules RAR transmissions. In some instances, the segment index may be indicated via least significant bits (LSBs) of a sequence frame number (SNF) information element (IE) of the DCI Format 1_0 that schedules RAR transmissions. In some instances, the segment index may be indicated by a first part and a second part. The first part may be included in a payload of DCI Format 1_0 with CRC scrambled by RA-RNTI. The second part may be conveyed by selecting a scrambling sequence to scramble CRC bits of DCI Format 1_0. Additionally, the first part may indicate an index associated with the scrambling sequence. In some embodiments, the RA-RNTI associated with an RO may be determined based on a reference SCS that is larger than the SCS of the RO.

Figure 19:
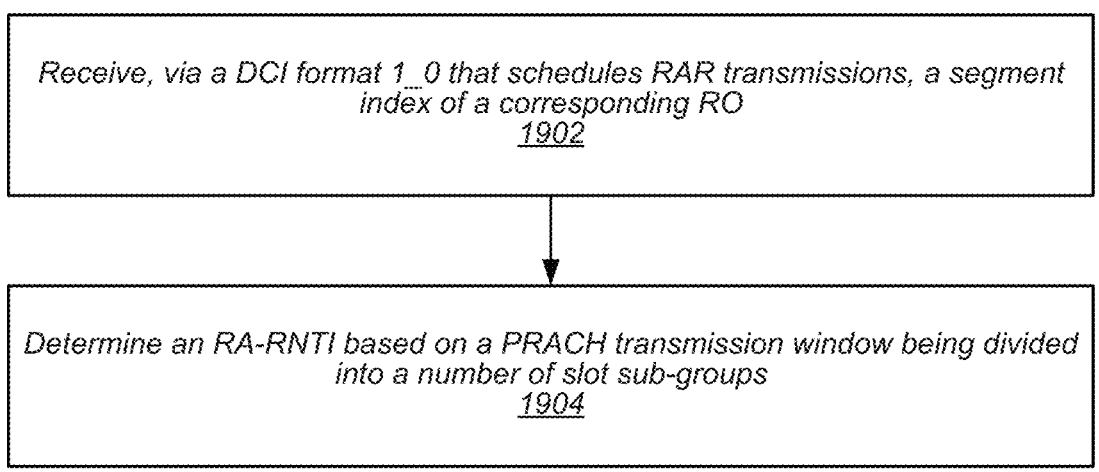

FIG. 19 illustrates a yet further example of a block diagram for a method for initial access communications, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1902, a UE, such as UE 106, may receive, via a downlink control indicator (DCI) format 1_0 that schedules random access channel (RACH) response (RAR) transmissions, a segment index of a corresponding RACH occasion (RO). The segment index may be based, at least in part, on a sub-carrier spacing (SCS).

At 1904, the UE may determine a random access (RA) radio network temporary identifier (RNTI) based on a physical random access channel (PRACH) transmission window being divided into a number of slot sub-groups. Note that the number of slot sub-groups may be based on the SCS of the RO and may determine the segment index. In some instances, the segment index may be a field of the DCI format 1_0 that schedules RAR transmissions. In some instances, the segment index may be indicated via least significant bits (LSBs) of a sequence frame number (SNF) information element (IE) of the DCI Format 1_0 that schedules RAR transmissions. In some instances, the segment index may be indicated by a first part and a second part. The first part may be included in a payload of DCI Format 1_0 with CRC scrambled by RA-RNTI. The second part may be conveyed by selecting a scrambling sequence to scramble CRC bits of DCI Format 1_0. Additionally, the first part may indicate an index associated with the scrambling sequence. In some embodiments, the RA-RNTI associated with an RO may be determined based on a reference SCS that is larger than the SCS of the RO.

In some embodiments, the UE may configure and/or receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS) and a resource block offset based one or more of a synchronization raster and a component carrier raster. The configuration for a CORESET by a data structure that includes one or more indexes. Each index of the one or more indexes may specify an SSB and CORESET multiplexing pattern, a number of PRBs for the CORESET, a number of symbols for the CORESET, and an offset between a smallest resource block (RB) index of the CORESET and a smallest RB of a corresponding SSB. Additionally, indexes with a value of 8 and/or 9 may indicate CORESET configurations including 96 PRBs. In some instances, the resource block offset may be applied for all SCSs or a subset of SCSs, e.g., a subset of 120 kHz, 480 kHz, and 960 kHz SCSs. For example, the resource block offset may be specified as [0, 1, 2, 4] and/or as [0, 2].

In some embodiments, the UE may receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW, e.g., based on the configuration and resource block offset. Further, the UE may monitor a Type0 physical downlink control channel (PDCCH) search space set in at least one of the CORESET #0 or RMSI slot that is paired with an SSB index of the one or more SSB transmissions within the SSBBW.

In some embodiments, the one or more SSB transmissions may be received in an SSB slot in the SSBBW with a first SCS. Additionally, the Type0 PDCCH search space set for RMSI scheduling may be monitored in a CORESET0/RMSI slot in the SSBBW with a second SCS. Note that there may be is a one-to-one association between SSBs transmitted in the SSB slot in the SSBBW and the Type0 PDCCH search space set for the UE to monitor in the CORESET0/RMSI slot in the SSBBW.

In addition, the SSB slots may include a first M consecutive slots of the SSBBW with a first SCS and the CORESET0/RMSI slots may include a subsequent N consecutive slots of the SSBBW with a second SCS. In some instances, values of <M, N> pairs may be specified for various combinations of first SCSs and second SCSs. Note that the first SCS may be smaller than the second SCS.

In some embodiments, the UE may determine positions of random access channel (RACH) occasion (RO) slots with a third SCS within a physical RACH (PRACH) slot of a reference sub-carrier spacing (SCS) based on a configuration index included in a higher layer parameter. Additionally, the UE may determine a distribution of ROs with the third SCS based on a total number of time domain ROs in the PRACH slot of the reference SCS. The third SCS may be one of a 480 kHz SCS or a 960 kHz SCS, which may be larger than the reference SCS of the PRACH slot. In addition, when a number of slots of the third SCS in a PRACH slot of a reference SCS are greater than or equal to the total number of time-domain ROs, N, within a reference slot, the time-domain ROs with the third SCS may be evenly distributed over a last N slots of the third SCS in the reference slot of the reference SCS with one RO per slot of the third SCS. Note that each time-domain RO may use a same starting symbol in a slot of the third SCS. Further, the starting symbol may be configured via higher layers for each slot of the third SCS. Additionally, when a number of slots of the third SCS in a PRACH slot of a reference SCS is less than a number of time-domain ROs, N, within a reference slot, the time-domain ROs may be distributed over all slots of the third SCS in a reference slot. Note that each of the first $M_1$ slots may include $K_1$ ROs and each of the subsequent $M_2$ slots may include $K_2$ ROs, where $$M_1 = \mod(N, Q),$$

$$K_1 = \text{ceiling}\left(\frac{N}{Q}\right), \text{ and}$$

$$M_2 = N - M_1,$$

$$K2 = \text{floor}\left(\frac{N}{Q}\right),$$

Q represents the number of slots of the third SCS in a PRACH slot of the reference SCS. In some embodiments, when a number of slots of the third SCS in a PRACH slot of a reference SCS is less than a number of time-domain ROs, N, within a reference slot, the time-domain ROs may be located in a last slot of the third SCS of a reference slot window.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform communications;
   wherein the one or more processors are configured to cause the UE to:
      receive a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS);
      receive, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW based on the configuration; and
      determine, based on a configuration index included in a higher later parameter, positions of random access channel (RACH) occasion (RO) slots associated with a high frequency SCS within a reference physical RACH (PRACH) slot window associated with a reference SCS, wherein the positions of ROs are located in a last slot associated with the high SCS of the PRACH slot window.

2. The UE of claim 1,
   wherein the configuration for a CORESET is specified by a data structure that includes one or more indexes, wherein each index of the one or more indexes specifies an SSB and CORESET multiplexing pattern, a number of PRBs for the CORESET, a number of symbols for the CORESET, and an offset between a smallest Resource Block (RB) index of the CORESET and a smallest RB of a corresponding SSB.

3. The UE of claim 1,
   wherein the resource block offset is applied for all SCSs or a subset of SCSs, and wherein the resource block offset is specified as at least one of [0, 1, 2, 4] or [0, 2].

4. The UE of claim 1,
   wherein the one or more processors are further configured to cause the UE to:
      monitor a Type0 physical downlink control channel (PDCCH) search space set in at least one of the CORESET #0 or RMSI slot that is paired with an SSB index of the one or more SSB transmissions within the SSBBW.

5. The UE of claim 1,
   wherein the one or more SSB transmissions are received in an SSB slot in the SSBBW with a first SCS; and
   wherein the Type0 PDCCH search space set for RMSI scheduling is monitored in a CORESET0/RMSI slot in the SSBBW with a second SCS.

6. The UE of claim 5,
   wherein there is a one-to-one association between SSBs transmitted in the SSB slot in a SSBBW and the Type0 PDCCH search space set for the UE to monitor in the CORESET0/RMSI slot in the SSBBW.

7. The UE of claim 5,
   wherein the SSB slots include a first M consecutive slots of the SSBBW with a first SCS and the CORESET0/RMSI slots include a subsequent N consecutive slots of the SSBBW with a second SCS, and wherein values of <M, N>pairs are specified for one or more combinations of first SCSs and second SCSs, and wherein the first SCS is smaller than the second SCS.

8. The UE of claim 1,
   wherein the one or more processors are further configured to cause the UE to:
      receive, via a downlink control indicator (DCI) format 1_0 that schedules random access channel (RACH) response (RAR) transmissions, a segment index of a corresponding RACH occasion (RO), wherein the segment index is based, at least in part, on a sub-carrier spacing (SCS), wherein the segment index is a field of the DCI format 1_0 that schedules RAR transmissions, wherein the segment index is indicated via least significant bits (LSBs) of a sequence frame number (SNF) information element (IE) of the DCI Format 1_0 that schedules RAR transmissions or via a first part and a second part, wherein the first part is included in a payload of DCI Format 1_0 with CRC scrambled by RA-RNTI, wherein the second part is conveyed by selecting a scrambling sequence to scramble CRC bits of DCI Format 1_0, and wherein the first part indicates an index associated with the scrambling sequence; and determine a random access (RA) radio network temporary identifier (RNTI) based on a physical random access channel (PRACH) transmission window being divided into a number of slot sub-groups, wherein the number of slot sub-groups is based on the SCS of the RO and determines the segment index, and wherein the RA-RNTI associated with an RO is determined based on a reference SCS that is larger than the SCS of the RO.

9. An apparatus, comprising:

a memory; and at least one processor in communication with the memory and configured to:

receive, in a synchronization signal block (SSB) burst window (SSBBW), one or more SSB transmissions and at least one of a random-access control resource set (CORESET) #0 or a remaining minimum system information (RMSI);

monitor a Type0 physical downlink control channel (PDCCH) search space set in at least one of the CORESET #0 or RMSI paired with an SSB index of the one or more SSB transmissions in the same SSBBW; and determine, based on a configuration index included in a higher later parameter, positions of random access channel (RACH) occasion (RO) slots associated with a high frequency SCS within a reference physical RACH (PRACH) slot window associated with a reference SCS, wherein the positions of ROs are located in a last slot associated with the high SCS of the PRACH slot window.

10. The apparatus of claim 9, wherein the one or more SSB transmissions are received in an SSB slot in a SSBBW with a first SCS; and wherein the Type0 PDCCH search space set in CORESET #0 for RMSI scheduling is monitored in a CORESET0/RMSI slot in the SSBBW with a second SCS.

11. The apparatus of claim 10, wherein there is a one-to-one association between SSBs transmitted in the SSB slot in a SSBBW and the Type0 PDCCH search space set for a UE to monitor in the CORESET0/RMSI slot in the SSBBW.

12. The apparatus of claim 10, wherein the SSB slots include a first M consecutive slots of the SSBBW with a first SCS and the CORESET0/RMSI includes a subsequent N consecutive slots of the SSBBW with a second SCS.

13. The apparatus of claim 9, wherein the at least one processor is configured to:

determine a distribution of ROs based on a total number of time domain ROs in the PRACH slot of the reference SCS, wherein the SCS is one of a 480 kHz SCS or a 960 kHz SCS that is larger than the reference SCS of PRACH slot.

14. A method, comprising:

receiving a configuration for a control resource set (CORESET) for a Type0 physical downlink control channel (PDCCH) search space set based on supporting at least 96 physical resource blocks (PRBs) for one or more of 120 kilohertz (kHz), 480 kHz, or 960 kHz sub-carrier spacing (SCS);

receiving, in a synchronization signal block (SSB) burst window (SSBBW), one or more SSB transmissions and at least one of a Type0 PDCCH search space set in CORESET #0 or a remaining minimum system information (RMSI) that is paired with an SSB transmission in the same SSBBW based on the configuration; and determining, based on a configuration index included in a higher later parameter, positions of random access channel (RACH) occasion (RO) slots associated with a high frequency SCS within a reference physical RACH (PRACH) slot window associated with a reference SCS, wherein the positions of ROs are located in a last slot associated with the high SCS of the PRACH slot window.

15. The method of claim 14, wherein the configuration for a CORESET is specified by a data structure that includes one or more indexes, wherein each index of the one or more indexes specifies an SSB and CORESET multiplexing pattern, a number of PRBs for the CORESET, a number of symbols for the CORESET, and an offset between a smallest Resource Block (RB) index of the CORESET and a smallest RB of a corresponding SSB.

16. The method of claim 14, wherein the resource block offset is applied for all SCSs or a subset of SCSs, and wherein the resource block offset is specified as at least one of [0, 1, 2, 4] or [0, 2].

17. The method of claim 14, further comprising:

monitoring a Type0 physical downlink control channel (PDCCH) search space set in at least one of the CORESET #0 or RMSI slot that is paired with an SSB index of the one or more SSB transmissions within the SSBBW.

18. The method of claim 14, wherein the one or more SSB transmissions are received in an SSB slot in the SSBBW with a first SCS; and wherein the Type0 PDCCH search space set for RMSI scheduling is monitored in a CORESET0/RMSI slot in the SSBBW with a second SCS.

19. The method of claim 18, wherein there is a one-to-one association between SSBs transmitted in the SSB slot in a SSBBW and the Type0 PDCCH search space set to monitor in the CORESET0/RMSI slot in the SSBBW.

20. The method of claim 18, wherein the SSB slots include a first M consecutive slots of the SSBBW with a first SCS and the CORESET0/RMSI slots include a subsequent N consecutive slots of the SSBBW with a second SCS, and wherein values of <M, N>pairs are specified for one or more combinations of first SCSs and second SCSs, and wherein the first SCS is smaller than the second SCS.

* * * * *

UNITED STATES PATENT AND TRADEMARK OFFICE
CERTIFICATE OF CORRECTION

PATENT NO. : 12,279,312 B2
APPLICATION NO. : 17/439349
DATED : April 15, 2025
INVENTOR(S) : Hong He et al.

Page 1 of 1

It is certified that error appears in the above-identified patent and that said Letters Patent is hereby corrected as shown below:

In the Claims

Column 32, Line 44, Claim 5, delete "CORESETO" and insert --CORESET0--.
Column 32, Line 50, Claim 6, delete "CORESETO" and insert --CORESET0--.
Column 32, Line 53, Claim 7, delete "CORESETO" and insert --CORESET0--.
Column 33, Line 48, Claim 10, delete "CORESETO" and insert --CORESET0--.
Column 33, Line 54, Claim 11, delete "CORESETO" and insert --CORESET0--.
Column 33, Line 57, Claim 12, delete "CORESETO" and insert --CORESET0--.
Column 34, Line 48, Claim 18, delete "CORESETO" and insert --CORESET0--.
Column 34, Line 53, Claim 19, delete "CORESETO" and insert --CORESET0--.
Column 34, Line 57, Claim 20, delete "CORESETO" and insert --CORESET0--.

Signed and Sealed this
Twenty-second Day of July, 2025

Coke Morgan Stewart
*Acting Director of the United States Patent and Trademark Office*